(12) United States Patent
Fujiwara

(10) Patent No.: US 9,772,483 B2
(45) Date of Patent: Sep. 26, 2017

(54) MICROSCOPIC IMAGING DEVICE, MICROSCOPIC IMAGING METHOD, AND MICROSCOPIC IMAGING PROGRAM

(71) Applicant: Keyence Corporation, Osaka (JP)

(72) Inventor: Masaki Fujiwara, Osaka (JP)

(73) Assignee: Keyence Corporation, Osaka (JP)

( * ) Notice: Subject to any disclaimer, the term of this patent is extended or adjusted under 35 U.S.C. 154(b) by 328 days.

(21) Appl. No.: 14/481,956

(22) Filed: Sep. 10, 2014

(65) Prior Publication Data
US 2015/0116478 A1    Apr. 30, 2015

(30) Foreign Application Priority Data

Oct. 25, 2013  (JP) ................................ 2013-222723

(51) Int. Cl.
| | |
|---|---|
| G02B 21/06 | (2006.01) |
| G02B 21/00 | (2006.01) |
| G02B 21/12 | (2006.01) |
| G02B 21/24 | (2006.01) |
| G02B 21/36 | (2006.01) |
| G02B 21/08 | (2006.01) |

(52) U.S. Cl.
CPC ......... *G02B 21/06* (2013.01); *G02B 21/0088* (2013.01); *G02B 21/12* (2013.01); *G02B 21/24* (2013.01); *G02B 21/361* (2013.01); *G02B 21/365* (2013.01); *G02B 21/086* (2013.01)

(58) Field of Classification Search
CPC .... G02B 21/0088; G02B 21/06; G02B 21/12; G02B 21/24; G02B 21/361; G02B 21/365; G02B 21/086
See application file for complete search history.

(56) References Cited

U.S. PATENT DOCUMENTS

| | | | |
|---|---|---|---|
| 6,376,818 B1* | 4/2002 | Wilson | G02B 21/0044 250/201.3 |
| 7,729,049 B2* | 6/2010 | Xu | G02B 21/06 345/419 |
| 2002/0097490 A1* | 7/2002 | Endo | G02B 21/008 359/388 |

FOREIGN PATENT DOCUMENTS

| | | |
|---|---|---|
| JP | 2000-506634 A | 5/2000 |
| WO | 9845745 A1 | 10/1998 |

* cited by examiner

*Primary Examiner* — Christopher S Kelley
*Assistant Examiner* — Maria Vazquez Colon
(74) *Attorney, Agent, or Firm* — Kilyk & Bowersox, P.L.L.C.

(57) ABSTRACT

To provide a microscopic imaging device capable of easily switching the imaging method. During sectioning observation and normal observation, a measuring object is irradiated with pattern measurement light and uniform measurement light generated by a light modulation element, respectively. The measuring object is irradiated with the pattern measurement light and the uniform measurement light through a common light path. During the sectioning observation, a spatial phase of the pattern is sequentially moved on the measuring object by a predetermined amount by the light modulation element, and sectioning image data indicating an image of the measuring object is generated based on a plurality of pieces of image data generated at a plurality of phases of the pattern based on the light receiving signal. During the normal observation, normal image data indicating an image of the measuring object is generated based on the light receiving signal.

11 Claims, 24 Drawing Sheets

GFP

Texas Red

DAPI

TRANSMISSIVE OBSERVATION
(PHASE DIFFERENCE OBSERVATION)

G F P + Texas Red

G F P + Texas Red + TRANSMISSIVE OBSERVATION

GFP + Texas Red+DAPI + TRANSMISSIVE OBSERVATION

MICROSCOPIC IMAGING DEVICE, MICROSCOPIC IMAGING METHOD, AND MICROSCOPIC IMAGING PROGRAM

CROSS-REFERENCE TO RELATED APPLICATIONS

The present application claims foreign priority based on Japanese Patent Application No. 2013-222723, filed Oct. 25, 2013, the contents of which is incorporated herein by reference.

BACKGROUND OF THE INVENTION

1. Field of the Invention

The present invention relates to a microscopic imaging device, a microscopic imaging method, and a microscopic imaging program.

2. Description of Related Art

A microscopic imaging device that generates an image usable for creating a three-dimensional image by optical sectioning (cutting) has been proposed (see JP 2000-506634 A).

In the microscopic imaging device described in JP 2000-506634 A, a mask is arranged in a light source so that an object is illuminated with a spatially periodic pattern. A mask pattern is thereby projected on a sample. The mask is moved to at least 3 positions by a carriage in order to adjust a spatial phase of the mask pattern. The 3 or more images of the object illuminated at least 3 positions of the mask are analyzed to generate a three-dimensional image of the object.

A microscopic imaging device capable of switching between an imaging method that uses light with a pattern and an imaging method that uses light without a pattern is desired. However, in the microscopic imaging device of JP 2000-506634 A, a mask needs to be insertable and removable to a light path when switching the imaging method. Thus, it is troublesome to switch the imaging method. Furthermore, the microscopic imaging device becomes large and heavy if a light projecting section that emits light with a pattern and a light projecting section that emits light without a pattern are arranged in the microscopic imaging device.

SUMMARY OF THE INVENTION

It is an object of the present invention to provide a microscopic imaging device, a microscopic imaging method, and a microscopic imaging program capable of easily switching the imaging method while achieving miniaturization and lighter weight.

(1) According to one embodiment of the invention, a microscopic imaging device includes a first light projecting section that emits light; a light modulation element that is configured to selectively generate first measurement light with a pattern and second measurement light without a pattern from the light emitted by the first light projecting section; a first light projection optical system that irradiates a measuring object with the first and second measurement light generated by the light modulation element through a common light path; a light receiving section that receives light from the measuring object and outputs a light receiving signal indicating a light receiving amount; an image data generating portion that generates image data based on the light receiving signal output from the light receiving section; a pattern generating portion that generates a pattern to be irradiated on the measuring object while sequentially moving a spatial phase by a predetermined amount; an instructing section that switches a first observation mode of observing the measuring object using the first measurement light and a second observation mode of observing the measuring object using the second measurement light; and a controller that controls the light modulation element based on the pattern generated by the pattern generating portion and controls the image data generating portion to generate sectioning image data indicating an image of the measuring object based on a plurality of pieces of image data generated at a plurality of phases of the pattern during the first observation mode, and controls the image data generating portion to generate normal image data indicating an image of the measuring object during the second observation mode.

In the microscopic imaging device, an instruction to switch the first observation mode and the second observation mode is accepted. The first observation mode is a mode of observing the measuring object using the first measurement light with a pattern, and the second observation mode is a mode of observing the measuring object using the second measurement light without a pattern.

The first measurement light is generated by the light modulation element from the light emitted by the first light projecting section in the first observation mode, and the second measurement light is generated by the light modulation element from the light emitted by the first light projecting section in the second observation mode. In the first observation mode, the measuring object is irradiated by the first light projection optical system with the first measurement light generated by the light modulation element, and in the second observation mode, the measuring object is irradiated by the first light projection optical system with the second measurement light generated by the light modulation element. The measuring object is irradiated with the first and second measurement light through a common light path. In the first observation mode, a spatial phase of the generated pattern is sequentially moved on the measuring object by a predetermined amount by the light modulation element.

The light from the measuring object is received by the light receiving section, and the light receiving signal indicating the light receiving amount is output. In the first observation mode, the sectioning image data indicating an image of the measuring object is generated based on a plurality of pieces of image data generated at a plurality of phases of the pattern based on the light receiving signal output from the light receiving section. In the second observation mode, the normal image data indicating an image of the measuring object is generated based on the light receiving signal output from the light receiving section.

In this case, the first and second measurement light is selectively generated by the light modulation element, so that a plurality of light projecting sections for generating the first and second measurement light do not need to be arranged in the microscopic imaging device. Furthermore, the measuring object can be irradiated with the first and second measurement light using a common light projection optical system since the first and second measurement light passes through a common light path.

Moreover, the irradiation center and the irradiation range of the first measurement light, and the irradiation center and the irradiation range of the second measurement light can be coincided without aligning the optical axes of the first and second measurement light. As a result, the imaging method can be easily switched while achieving miniaturization and lighter weight of the microscopic imaging device.

(2) The light modulation element may include a light guiding state of guiding the first or second measurement light to the first light projection optical system, and a light shielding state of not guiding the first and second measurement light to the first light projection optical system, and the controller may control the light guiding state and the light shielding state of the light modulation element.

In this case, the irradiation with the first and second measurement light on the measuring object can be shielded if the measuring object is not being observed. The damage of the measuring object that occurs when the measuring object is continuously irradiated with the first and second measurement light thus can be reduced.

(3) The instructing section may be configured to instruct an observation region, and the controller may control the light guiding state and the light shielding state for each of a plurality of portions of the light modulation element so that an observation region instructed by the instructing section is irradiated with the first or second measurement light, and a region other than the observation region is not irradiated with the first and second measurement light.

In this case, the region other than the observation region of the measuring object is not irradiated with the first and second measurement light. The damage of the measuring object that occurs when the measuring object is continuously irradiated with the first and second measurement light thus can be minimized.

(4) The controller may control a ratio of a period of the light guiding state to a period of the light shielding state of the light modulation element in a light receiving period of the light receiving section. In this case, the brightness of the image of the measuring object can be adjusted.

(5) The controller may control a ratio of the period of the light guiding state to the period of the light shielding state for each of the plurality of portions of the light modulation element.

In this case, the unevenness in brightness for every portion of the image can be alleviated. The brightness of the image thus can be evened.

(6) The microscopic imaging device may further include a light shielding mechanism including a light guiding state of guiding light from the first light projecting section to the light modulation element, and a light shielding state of not guiding the light from the first light projecting section to the light modulation element, wherein the controller may control the light guiding state and the light shielding state of the light shielding mechanism.

In this case, the irradiation with light on the light modulation element can be shielded if the measuring object is not being observed. Thus, the damage of the light modulation element that occurs when the light modulation element is continuously irradiated with light can be reduced.

(7) The controller may control the light shielding mechanism to the light shielding state after elapse of a constant time when the light modulation element is in the light shielding state.

According to such a configuration, the irradiation with the first and second measurement light on the measuring object is shielded by the light modulation element if the measuring object is not being observed. If a constant time has elapsed in this state, the irradiation with light on the light modulation element is shielded by the light shielding mechanism. The damage of the light modulation element that occurs when the light modulation element is continuously irradiated with light thus can be reduced.

(8) The light shielding mechanism may include a mechanical shutter, and may be arranged on a light path from the first light projecting section to the light modulation element. In this case, the irradiation with light on the light modulation element can be easily shielded.

(9) The light shielding mechanism may include a switching mechanism, and may stop supply of power to the first light projecting section. In this case, the irradiation with light on the light modulation element can be easily shielded.

(10) The microscopic imaging device may further include a second light projecting section that emits third measurement light; and a second light projection optical system that irradiates the measuring object with the third measurement light emitted by the second light projecting section, wherein the instructing section may be configured to further switch between the first or second observation mode and a third observation mode of observing the measuring object using the third measurement light; and the controller may control the light shielding mechanism to the light shielding state, and control the image data generating portion to generate transmission image data indicating an image of the measuring object during the third observation mode.

In this case, the first to third observation modes are instructed by the instructing section. In the third observation mode, the transmission image data indicating an image of the measuring object is generated based on the third measurement light transmitted through the measuring object. The observation method of the measuring object is thereby diversified. Furthermore, in the third observation mode, the light shielding mechanism is controlled to the light shielding state, so that the damage of the light modulation element that occurs when the light modulation element is continuously irradiated with light can be reduced.

(11) According to another embodiment of the invention, a microscopic imaging method includes the steps of accepting an instruction to switch a first observation mode of observing a measuring object using first measurement light with a pattern and a second observation mode of observing the measuring object using second measurement light without a pattern; emitting light by a first light projecting section; generating the first measurement light by a light modulation element from the light emitted by the first light projecting section during the first observation mode, and generating the second measurement light by the light modulation element from the light emitted by the first light projecting section during the second observation mode; irradiating the measuring object by a first light projection optical system with the first measurement light generated by the light modulation element during the first observation mode, and irradiating the measuring object by the first light projection optical system with the second measurement light generated by the light modulation element during the second observation mode; sequentially moving a spatial phase of the generated pattern on the measuring object by a predetermined amount by the light modulation element during the first observation mode; receiving light from the measuring object with a light receiving section, and outputting a light receiving signal indicating a light receiving amount; and generating sectioning image data indicating an image of the measuring object based on a plurality of pieces of image data generated at a plurality of phases of the pattern based on the light receiving signal output from the light receiving section during the first observation mode, and generating normal image data indicating an image of the measuring object based on the light receiving signal output from the light receiving section during the second observation mode, wherein the measuring object is irradiated by the first light projection optical system with the first and second measurement light generated by the light modulation element through a common light path.

According to the microscopic imaging method, an instruction to switch the first observation mode and the second observation mode is accepted. The first observation mode is a mode of observing the measuring object using the first measurement light with a pattern, and the second observation mode is a mode of observing the measuring object using the second measurement light without a pattern.

The first measurement light is generated by the light modulation element from the light emitted by the first light projecting section in the first observation mode, and the second measurement light is generated by the light modulation element from the light emitted by the first light projecting section in the second observation mode. In the first observation mode, the measuring object is irradiated by the first light projection optical system with the first measurement light generated by the light modulation element, and in the second observation mode, the measuring object is irradiated by the first light projection optical system with the second measurement light generated by the light modulation element. The measuring object is irradiated with the first and second measurement light through a common light path. In the first observation mode, a spatial phase of the generated pattern is sequentially moved on the measuring object by a predetermined amount by the light modulation element.

The light from the measuring object is received by the light receiving section, and the light receiving signal indicating the light receiving amount is output. In the first observation mode, the sectioning image data indicating an image of the measuring object is generated based on a plurality of pieces of image data generated at a plurality of phases of the pattern based on the light receiving signal output from the light receiving section. In the second observation mode, the normal image data indicating an image of the measuring object is generated based on the light receiving signal output from the light receiving section.

In this case, the first and second measurement light is selectively generated by the light modulation element, so that a plurality of light projecting sections for generating the first and second measurement light do not need to be arranged in the microscopic imaging device. Furthermore, the measuring object can be irradiated with the first and second measurement light using a common light projection optical system since the first and second measurement light passes through a common light path.

Moreover, the irradiation center and the irradiation range of the first measurement light, and the irradiation center and the irradiation range of the second measurement light can be coincided without aligning the optical axes of the first and second measurement light. As a result, the imaging method can be easily switched while achieving miniaturization and lighter weight of the microscopic imaging device.

(12) According to still another embodiment of the invention, a microscopic imaging program executable by a processing device, the microscopic imaging program causes the processing device to execute the processes of accepting an instruction to switch a first observation mode of observing a measuring object using first measurement light with a pattern and a second observation mode of observing the measuring object using second measurement light without a pattern; emitting light by a first light projecting section; generating the first measurement light by a light modulation element from the light emitted by the first light projecting section during the first observation mode, and generating the second measurement light by the light modulation element from the light emitted by the first light projecting section during the second observation mode; irradiating the measuring object by a first light projection optical system with the first measurement light generated by the light modulation element during the first observation mode, and irradiating the measuring object by the first light projection optical system with the second measurement light generated by the light modulation element during the second observation mode; sequentially moving a spatial phase of the generated pattern on the measuring object by a predetermined amount by the light modulation element during the first observation mode; receiving light from the measuring object with a light receiving section, and outputting a light receiving signal indicating a light receiving amount; and generating sectioning image data indicating an image of the measuring object based on a plurality of pieces of image data generated at a plurality of phases of the pattern based on the light receiving signal output from the light receiving section during the first observation mode, and generating normal image data indicating an image of the measuring object based on the light receiving signal output from the light receiving section during the second observation mode, wherein the measuring object is irradiated by the first light projection optical system with the first and second measurement light generated by the light modulation element through a common light path.

According to the microscopic imaging program, an instruction to switch the first observation mode and the second observation mode is accepted. The first observation mode is a mode of observing the measuring object using the first measurement light with a pattern, and the second observation mode is a mode of observing the measuring object using the second measurement light without a pattern.

The first measurement light is generated by the light modulation element from the light emitted by the first light projecting section in the first observation mode, and the second measurement light is generated by the light modulation element from the light emitted by the first light projecting section in the second observation mode. In the first observation mode, the measuring object is irradiated by the first light projection optical system with the first measurement light generated by the light modulation element, and in the second observation mode, the measuring object is irradiated by the first light projection optical system with the second measurement light generated by the light modulation element. The measuring object is irradiated with the first and second measurement light through a common light path. In the first observation mode, a spatial phase of the generated pattern is sequentially moved on the measuring object by a predetermined amount by the light modulation element.

The light from the measuring object is received by the light receiving section, and the light receiving signal indicating the light receiving amount is output. In the first observation mode, the sectioning image data indicating an image of the measuring object is generated based on a plurality of pieces of image data generated at a plurality of phases of the pattern based on the light receiving signal output from the light receiving section. In the second observation mode, the normal image data indicating an image of the measuring object is generated based on the light receiving signal output from the light receiving section.

In this case, the first and second measurement light is selectively generated by the light modulation element, so that a plurality of light projecting sections for generating the first and second measurement light do not need to be arranged in the microscopic imaging device. Furthermore, the measuring object can be irradiated with the first and second measurement light using a common light projection optical system since the first and second measurement light passes through a common light path.

Moreover, the irradiation center and the irradiation range of the first measurement light, and the irradiation center and the irradiation range of the second measurement light can be coincided without aligning the optical axes of the first and second measurement light. As a result, the imaging method can be easily switched while achieving miniaturization and lighter weight of the microscopic imaging device.

The imaging method thus can be easily switched while achieving miniaturization and lighter weight of the microscopic imaging device.

DETAILED DESCRIPTION OF PREFERRED EMBODIMENTS (1) Configuration of Microscopic Imaging Device A microscopic imaging device according to one embodiment of the present invention will be described. In the microscopic imaging device according to the present embodiment, fluorescence observation of the measuring object can be carried out. Furthermore, in the microscopic imaging device, bright field observation, dark field observation, phase difference observation, differential interference observation, deviation observation, and polarization observation that use light transmitted through the measuring object can be carried out. In the following description, the bright field observation, the dark field observation, the phase difference observation, the differential interference observation, the deviation observation, and the polarization observation that use the light transmitted through the measuring object are collectively referred to as a transmissive observation.

Figure 1:
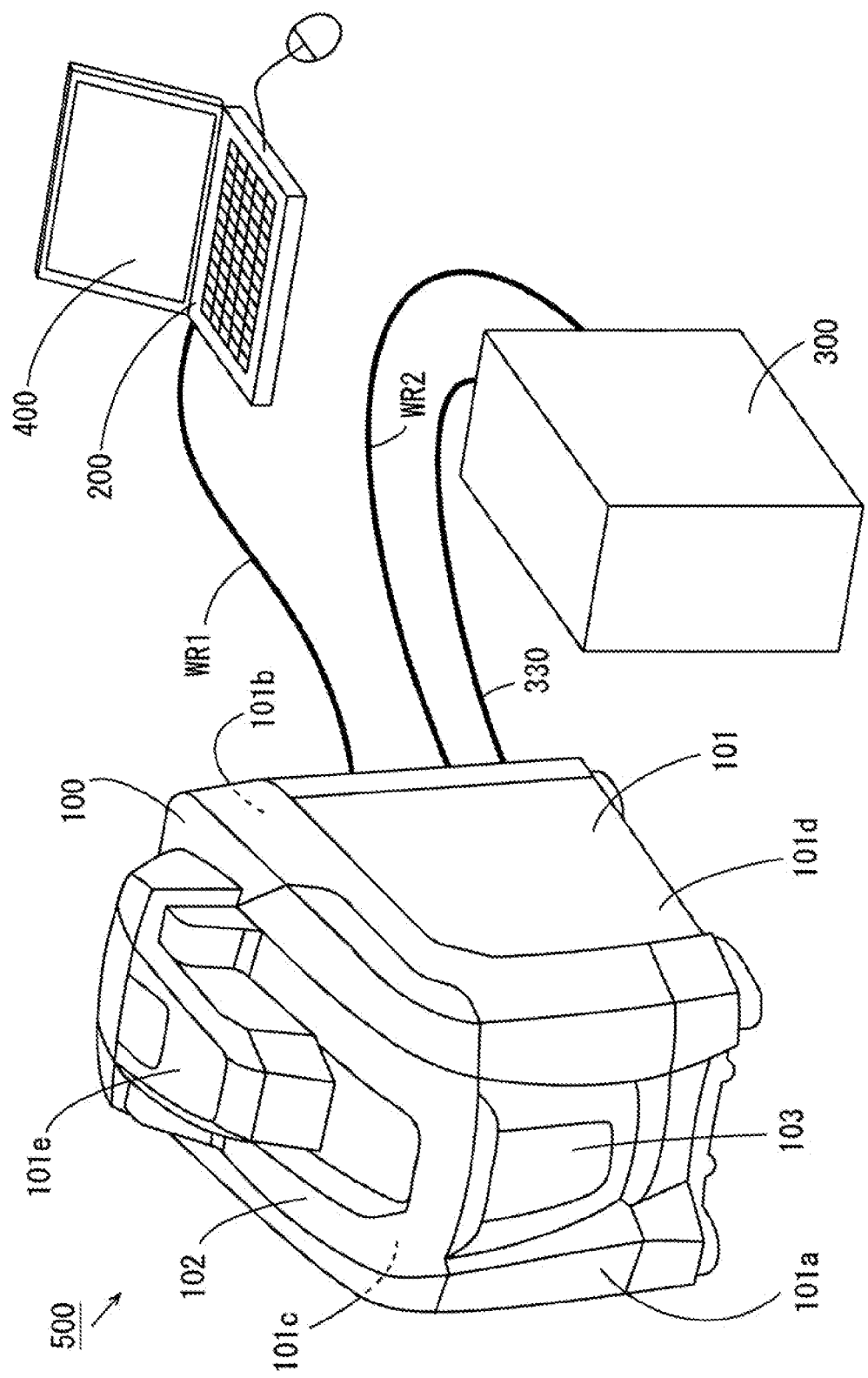
FIG. 1 is an outer appearance perspective view of a microscopic imaging device according to one embodiment of the present invention.

FIG. 1 is an outer appearance perspective view of a microscopic imaging device according to one embodiment of the present invention. As shown in FIG. 1, a microscopic imaging device 500 of the present example is mainly configured by a measurement unit 100, a PC (Personal Computer) 200, a measurement light supplying unit 300, and a display unit 400. The measurement unit 100 and the PC 200 are connected by wiring WR1. The measurement unit 100 and the measurement light supplying unit 300 are connected by wiring WR2 and a light guiding member 330.

In the example of FIG. 1, one notebook personal computer is used as a configuration in which the PC 200 and the display unit 400 are integrated. A LAN (Local Area Network) cable, USB (Universal Serial Bus) cable, or the like are used for the wiring WR1. A cable in which a power supply line and a signal line are integrated is used for the wiring WR2.

Figure 2:
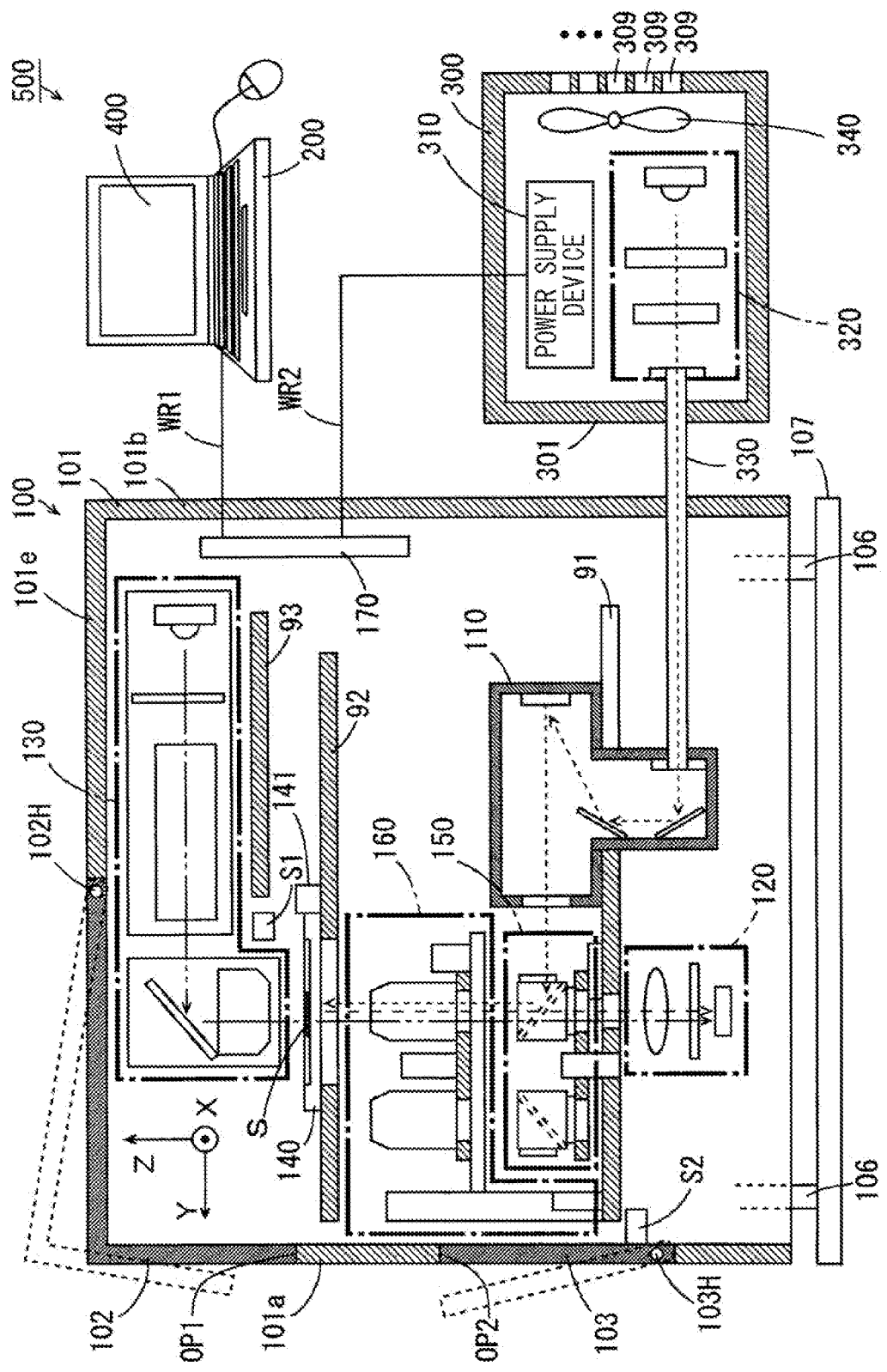
FIG. 2 is a view describing a hardware configuration of the microscopic imaging device of FIG. 1.

FIG. 2 is a view describing a hardware configuration of the microscopic imaging device 500 of FIG. 1. In FIG. 2, the longitudinal cross-sections of the measurement unit 100 and the measurement light supplying unit 300 are schematically shown.

As shown in FIG. 2, the measurement light supplying unit 300 includes a housing 301, a power supply device 310, a light projecting section 320, and a heat exhaust device 340. The power supply device 310, the light projecting section 320, and the heat exhaust device 340 are accommodated in the housing 301. The power supply device 310 supplies power to the light projecting section 320, and also supplies power to the measurement unit 100 through the wiring WR2.

Openings 309 for heat exhaust are formed in the housing 301 of the measurement light supplying unit 300. The heat exhaust device 340 includes a heat exhaust fan and a motor for driving the heat exhaust fan, and exhausts the heat generated in the power supply device 310 and the light projecting section 320 to the exterior of the housing 301 through the openings 309.

The measurement unit 100 includes an external housing 101, a plurality of supporting columns 106, a seating 107, a pattern applying section 110, a light receiving section 120, a transmitted light supplying section 130, a stage 140, a stage driving device 141, a filter unit 150, a lens unit 160, and a control board 170.

The external housing 101 accommodates the pattern applying section 110, the light receiving section 120, the transmitted light supplying section 130, the stage 140, the stage driving device 141, the filter unit 150, the lens unit 160, the control board 170, and a drive circuit (not shown) of each configuring element. The external housing 101 has a front surface portion 101a, a back surface portion 101b, a one-side surface portion 101c (FIG. 1), the other-side surface portion 101d (FIG. 1), and an upper surface portion 101e. An upper surface lid 102 is attached to the upper surface portion 101e. A front surface lid 103 is attached to the middle of the front surface portion 101a. A space including the stage 140 and the light receiving section 120 is in a dark room state when the upper surface lid 102 and the front surface lid 103 are closed.

In the external housing 101 are arranged a base frame 91, a stage frame 92, and an upper frame 93 so as to be disposed one above the other and to be parallel to the horizontal plane.

The base frame 91, the stage frame 92, and the upper frame 93 configure a part of a supporting body that supports the pattern applying section 110, the light receiving section 120, the transmitted light supplying section 130, the stage 140, the stage driving device 141, the filter unit 150, the lens unit 160, and the control board 170, which supporting body is supported by the plurality of supporting columns 106 and the seating 107.

The stage frame 92 is positioned above the base frame 91, and the upper frame 93 is positioned above the stage frame 92. The base frame 91 and the stage frame 92 are formed with an opening for transmitting light to be used for the observation of a measuring object S.

An opening is also formed at a central part of the stage 140. The stage 140 is integrally attached to the upper surface of the stage frame 92 so that the openings of the stage frame 92 and the stage 140 overlap each other. Furthermore, the stage 140 and the stage driving device 141 are attached to the upper surface of the stage frame 92.

The measuring object S is mounted on the stage 140 using a petri dish, preparation, or the like. A plane of the stage 140 on which the measuring object S is mounted is referred to as a mounting surface. In the present example, the mounting surface is maintained parallel to the horizontal plane.

In the following description, as shown with an arrow in FIG. 2, two directions orthogonal to each other on the mounting surface are defined as an X direction and a Y direction, and a direction orthogonal to the mounting surface is defined as a Z direction. The X direction corresponds to the left and right direction of the measurement unit 100, the Y direction corresponds to the front and back direction of the measurement unit 100, and the Z direction corresponds to the up and down direction of the measurement unit 100. The stage 140 is an X-Y stage, and is configured to be movable in the X direction and the Y direction. The stage driving device 141 moves the stage 140 in the X direction and the Y direction in response to a signal provided from the control board 170.

In the present example, the measuring object S is a biological specimen containing various types of protein. When carrying out fluorescence observation, a fluorescence reagent that fuses to a specific protein is applied to the measuring object S. The fluorescence reagent includes, for example, GFP (Green Fluorescence Protein), Texas Red, and DAPI (diamidino phenyl indole). The GFP absorbs light having a wavelength around 490 nm, and emits light having a wavelength around 510 nm. The Texas Red absorbs light having a wavelength around 596 nm and emits light having a wavelength around 620 nm. The DAPI absorbs light having a wavelength around 345 nm and emits light having a wavelength around 455 nm.

The pattern applying section 110, the filter unit 150, and the lens unit 160 are attached to the upper surface of the base frame 91, and the light receiving section 120 is arranged on the lower side of the base frame 91.

The filter unit 150 is arranged at a position on the front side of the pattern applying section 110 on the base frame 91. The transmitted light supplying section 130 is attached to the upper surface of the upper frame 93.

Figure 3:
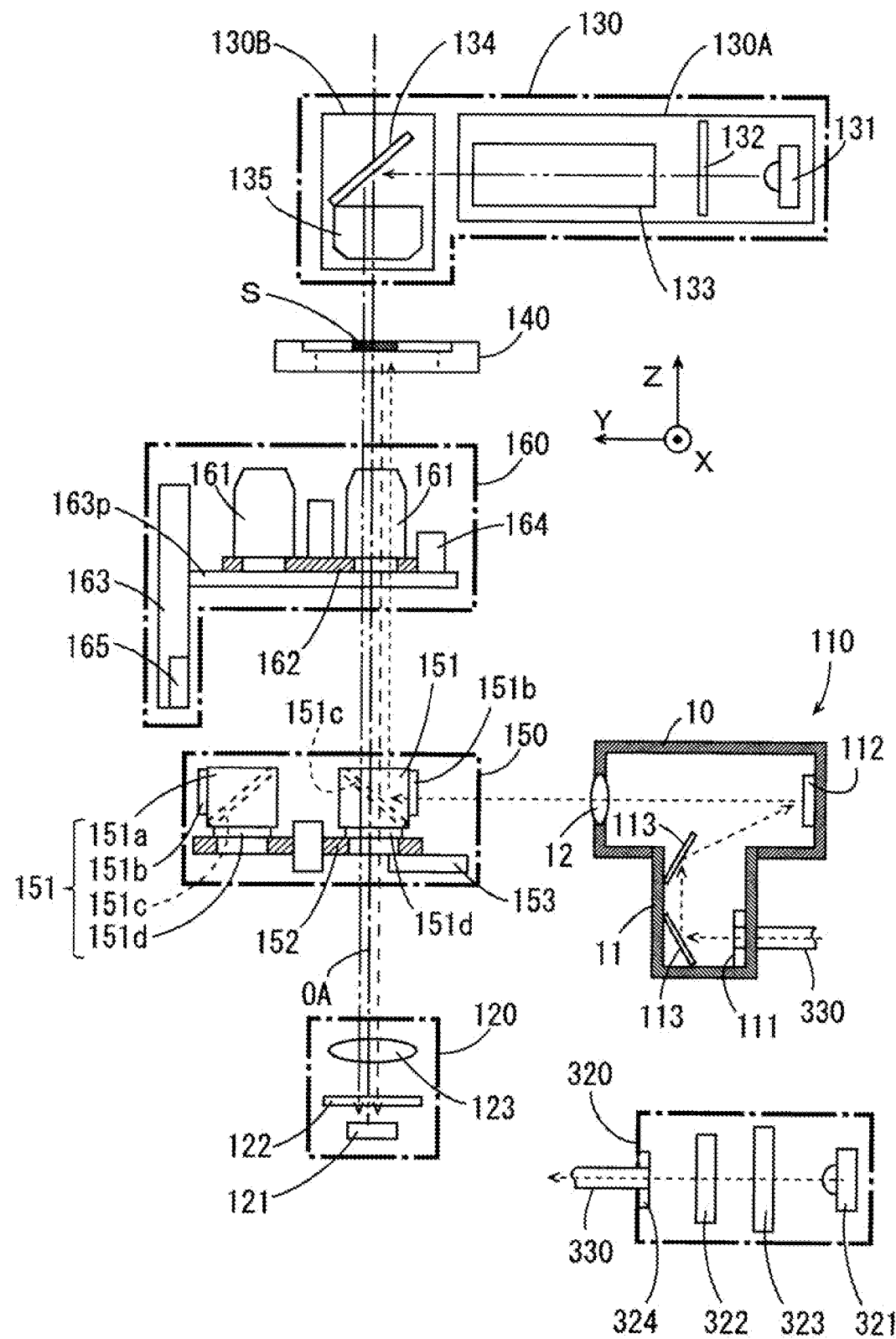
FIG. 3 is a schematic view showing a light path in a measurement unit and a measurement light supplying unit.

FIG. 3 is a schematic view showing a light path in the measurement unit 100 and the measurement light supplying unit 300. In FIG. 3, the details of each configuring element of the measurement unit 100 and the measurement light supplying unit 300 are shown along with the light path. Similarly to FIG. 2, the X direction, the Y direction, and the Z direction are shown with arrows in FIG. 3 as well.

As shown in FIG. 3, the light projecting section 320 of the measurement light supplying unit 300 includes a measurement light source 321, a light extinction mechanism 322, a light shielding mechanism 323, and an optical connector 324. One end of the light guiding member 330 is connected to the optical connector 324. In the present example, the light guiding member 330 is a liquid light guide. The light guiding member 330 may be, for example, a glass fiber or a quartz fiber.

The measurement light source 321 is, for example, a metal halide lamp. The measurement light source 321 may be other light sources such as a mercury lamp, a xenon lamp, a white LED (Light Emitting Diode), or the like. The measurement light source 321 is used as a light source for fluorescence observation of the measuring object S. The light emitted from the measurement light source 321 will be hereinafter referred to as measurement light.

The light shielding mechanism 323 is, for example, a mechanical shutter. The light shielding mechanism 323 is arranged to be positioned on the light path of the measurement light emitted from the measurement light source 321. If the light shielding mechanism 323 is in a light guiding state, the measurement light passes through the light shielding mechanism 323 and enters one end of the light guiding member 330. If, on the other hand, the light shielding mechanism 323 is in a light shielding state, the measurement light is shielded and thus does not enter the one end of the light guiding member 330. The light shielding mechanism 323 may include a light modulation element that can switch the passing and shielding of the measurement light. The light shielding mechanism 323 is, for example, in the light guiding state when the fluorescence observation of the measuring object S is carried out, and is in the light shielding state when the transmissive observation of the measuring object S is carried out. The light shielding mechanism 323 is, for example, also in the light shielding state during replacement work of an objective lens and a filter cube, and processing of an observation image, to be described later.

The light extinction mechanism 322 includes a plurality of ND (Neutral Density) filters having transmissivity different from each other, and a plurality of meshes having opening rates different from each other. The light extinction mechanism 322 is arranged so that any one of the plurality of ND filters is positioned on the light path of the measurement light having passed the light shielding mechanism 323. The ND filter positioned on the light path of the measurement light is selectively switched to adjust the intensity of the measurement light passing through the light extinction mechanism 322. In place of the plurality of ND filters, the light extinction mechanism 322 may include a light modulation element that can adjust the intensity of the measurement light, and the like.

The pattern applying section 110 of the measurement unit 100 includes an internal housing 10, a light guiding component supporting case 11, a light projection lens 12, an optical connector 111, a light modulation element 112, and a plurality of (2 in the present example) mirrors 113.

The internal housing 10 has a box shape. The light projection lens 12 is arranged on a front surface portion of the internal housing 10. The light modulation element 112 is attached on the inner side of a back surface portion of the internal housing 10. The light modulation element 112 is positioned on an optical axis of the light projection lens 12. The light guiding component supporting case 11 having a substantially cylindrical shape is attached to a lower surface portion of the internal housing 10. A lower end of the light guiding component supporting case 11 is closed. The 2 mirrors 113 and the optical connector 111 are arranged in the light guiding component supporting case 11.

The optical connector 111 is arranged in the vicinity of the lower end of the light guiding component supporting case 11. The other end of the light guiding member 330 is connected to the optical connector 111 through the back surface portion 101b from the back side of the measurement unit 100. The optical connector 111 supports the other end of the light guiding member 330 so that the measurement light guided by the light guiding member 330 emits from the back side toward the front side of the measurement unit 100 at the time of the fluorescence observation.

One mirror 113 is arranged to be inclined with respect to the XY plane in front of the optical connector 111. The other mirror 113 is arranged to be inclined with respect to the XY plane on the upper side of the one mirror 113. In such a state, the light modulation element 112 is positioned on the back side of the 2 mirrors 113 and on the upper side than the 2 mirrors 113. The measurement light emitted from the other end of the optical connector 111 is reflected by the one mirror 113 so as to be directed from the lower side toward the upper side of the measurement unit 100. The measurement light reflected by the one mirror 113 is reflected by the other mirror 113 so as to be directed from the diagonally lower front side toward the diagonally upper back side thus entering the light modulation element 112.

The light modulation element 112 is, for example, a DMD (Digital Micro-mirror Device). The light modulation element 112 may be a LCOS (Liquid Crystal on Silicon: reflective liquid crystal element). In the present example, a reflective device such as the DMD, the LCOS, or the like is used for the light modulation element 112. This is not the sole case, and a transmissive device such as an LCD (Liquid Crystal Display) and the like may be used in place of the reflective device for the light modulation element 112.

The light modulation element 112 is configured by a plurality of pixels arrayed in a two-dimensional form. In order to distinguish from pixels of a camera 121 of the light receiving section 120, to be described later, the pixels of the light modulation element 112 will be referred to as modulation pixels. The modulation pixel is a micro-mirror when the light modulation element 112 is the DMD, and the modulation pixel is a liquid crystal pixel when the light modulation element 112 is the LCOS or the LCD.

The light entering the light modulation element 112 is converted to have a pattern set in advance and intensity (brightness) set in advance by a pattern generating portion 212, to be described later, and reflected to be directed from the back side toward the front side of the measurement unit 100. The measurement light reflected by the light modulation element 112 enters the filter unit 150 through the light projection lens 12.

The filter unit 150 includes a plurality of filter cubes 151, a filter turret 152, and a filter turret drive unit 153. Each filter cube 151 includes a frame 151a, an excitation filter 151b, a dichroic mirror 151c, and an absorption filter 151d. The frame 151a is a member having a cuboid shape that supports the excitation filter 151b, the dichroic mirror 151c, and the absorption filter 151d.

The plurality of filter cubes 151 each correspond to a plurality of types of fluorescence reagents used in the fluorescence observation of the measuring object S. For example, if the GFP, the Texas Red, and the DAPI are used for the fluorescence reagent, the 3 types of filter cubes 151 corresponding to the GFP, the Texas Red, and the DAPI are arranged in the filter unit 150.

In this case, the excitation filter 151b of the filter cube 151 corresponding to the GFP allows light having a wavelength around 490 nm to pass therethrough, and the absorption filter 151d allows light having a wavelength around 510 nm to pass therethrough. The dichroic mirror 151c reflects light having a wavelength around 490 nm and allows light having a wavelength around 510 nm to pass therethrough.

The excitation filter 151b of the filter cube 151 corresponding to the Texas Red allows light having a wavelength around 596 nm to pass therethrough, and the absorption filter 151d allows light having a wavelength around 620 nm to pass therethrough. The dichroic mirror 151c reflects light having a wavelength around 596 nm and allows light having a wavelength around 620 nm to pass therethrough.

Furthermore, the excitation filter 151b of the filter cube 151 corresponding to the DAPI allows light having a wavelength around 345 nm to pass therethrough, and the absorption filter 151d allows light having a wavelength around 455 nm to pass therethrough. The dichroic mirror 151c reflects light having a wavelength around 345 nm and allows light having a wavelength around 455 nm to pass therethrough.

The filter turret 152 has a circular plate shape. Four through-holes are formed in the filter turret 152 at an angular interval of 90° with the center axis as the reference. The filter turret 152 is rotatably supported on the base frame 91 of FIG. 2 about the center axis of the filter turret 152. The filter turret drive unit 153 drives the filter turret 152 to rotate the filter turret 152.

Each of the plurality of filter cubes 151 is arranged on the filter turret 152 so that the excitation filter 151b is directed in a direction opposite to the center axis of the filter turret 152, and overlaps any one of the 4 through-holes.

In the present embodiment, 3 filter cubes 151 corresponding to the 3 types of fluorescence reagents are attached to the filter turret 152 so as to overlap 3 through-holes of the filter turret 152.

A user rotates the filter turret 152 during the fluorescence observation to select a desired filter cube 151. The selected filter cube 151 is arranged on an observation axis OA parallel to the Z direction passing through the measuring object S on the stage 140 so that the measurement light enters the excitation filter 151b. The observation axis OA is an optical axis of the light receiving section 120 extending in the Z direction. When the measurement light enters the excitation filter 151b, light of a certain wavelength region of the measurement light passes the excitation filter 151b. The light having passed the excitation filter 151b is reflected toward the upper side by the dichroic mirror 151c.

As described above, in the present embodiment, the 3 filter cubes 151 are attached to 3 through-holes of the filter turret 152, and the filter cube 151 is not attached to the one remaining through-hole. Thus, a bright field observation that does not use the filter cube 151 can be carried out by arranging on the observation axis OA (light path of the measurement light) the through-hole to which the filter cube 151 is not attached.

The lens unit 160 includes a plurality of objective lenses 161, a lens turret 162, a focal length adjustment mechanism 163, a lens supporting plate 163p, a lens turret drive unit 164, and a focal length adjustment drive unit 165. The plurality of objective lenses 161 has a magnification different from each other.

The focal length adjustment mechanism 163 is attached on the base frame 91 of FIG. 2. The focal length adjustment mechanism 163 supports the lens supporting plate 163p so as to be parallel to the XY plane and movable in the Z direction.

The lens turret 162 and the lens turret drive unit 164 are arranged on the lens supporting plate 163p. The lens turret 162 has a circular plate shape. Six through holes are formed in the lens turret 162 at an angular interval of 60° with a center axis as a reference. The lens turret 162 is rotatably supported about the center axis of the lens turret 162. The lens turret drive unit 164 drives the lens turret 162 to rotate the lens turret 162.

In the present embodiment, 6 objective lenses 161 having different magnifications from each other are attached on the lens turret 162 so as to overlap the 6 through-holes of the lens turret 162. In this state, the 6 objective lenses 161 are positioned on the lower side of the stage 140 and on the upper side of the filter unit 150.

The user rotates the lens turret 162 to select one objective lens 161 to use in the observation of the measuring object S. The selected objective lens 161 is arranged on the observation axis OA.

The focal length adjustment drive unit 165 drives the focal length adjustment mechanism 163 to move the lens supporting plate 163p in the Z direction. The relative distance in the Z direction between the measuring object S on the stage 140 and the selected objective lens 161 is thereby adjusted.

During the fluorescence observation of the measuring object S, the measurement light reflected by the dichroic mirror 151c of the filter cube 151 passes through the opening of the stage 140 while being collected by the selected objective lens 161, and applied on the measuring object S. When the measuring object S is irradiated with the measurement light, the fluorescence is emitted from the fluorescence reagent applied to the measuring object S. The fluorescence emitted to the lower side of the measuring object S passes through the selected objective lens 161, the filter cube 151 positioned on the lower side of the objective lens 161, and the opening formed in the base frame 91, and enters the light receiving section 120.

The transmitted light supplying section 130 attached to the upper frame 93 of FIG. 2 includes a fixing portion 130A and a swinging portion 130B. The fixing portion 130A includes a transmissive light source 131, a diaphragm adjustment portion 132, and a transmissive optical system 133, and is fixed on the upper surface of the upper frame 93 (FIG. 2).

The transmissive light source 131 is, for example, a white LED. The transmissive light source 131 may be other light sources such as a halogen lamp. The transmissive light source 131 is used as a light source for the transmissive observation of the measuring object S. The light emitted from the transmissive light source 131 is hereinafter referred to as transmitted light. The diaphragm adjustment portion 132 includes a diaphragm and a phase difference slit, and is used to adjust the brightness of the transmitted light to be applied on the measuring object S and to carry out the phase difference observation by the transmitted light. The transmissive optical system 133 includes a relay lens, and guides the transmitted light emitted from the transmissive light source 131 toward the front side of the fixing portion 130A. The relay lens is arranged so that a conjugate relation is maintained between the diaphragm and the phase difference slit of the diaphragm adjustment portion 132 and the front side focus position of a condenser lens 135.

The swinging portion 130B includes a mirror 134, the condenser lens 135 and a swing mechanism (not shown). The swinging portion 130B is configured to be swingable with an axis parallel to the X direction as a center with the upper surface lid 102 of FIG. 2 opened. Thus, the swinging portion 130B moves between a regular position where the condenser lens 135 faces the measuring object S on the stage 140 in the Z direction and a separated position where the condenser lens 135 does not face the measuring object S on the stage 140 in the Z direction.

During the transmissive observation of the measuring object S, the user manually moves the swinging portion 130B to the regular position. With the swinging portion 130B at the regular position, the transmitted light guided toward the front side from the fixing portion 130A is reflected toward the lower side by the mirror 134, and transmitted through the measuring object S on the stage 140 through the condenser lens 135.

As described above, the through-hole of the filter turret 152 in which the filter cube 151 is not arranged is selected during the transmissive observation in the filter unit 150. In this case, the transmitted light transmitted through the measuring object S passes through the objective lens 161 selected by the user, the through-hole of the filter turret 152, and the opening formed in the base frame 91, and enters the light receiving section 120.

The light receiving section 120 includes the camera 121, a color filter 122, and an imaging lens 123. The camera 121 is a CCD (Charge Coupled Device) camera including an imaging element, for example. In the present embodiment, the camera 121 has a digital zoom function. The imaging element is, for example, a monochrome CCD. The imaging element may be a color CCD or other imaging elements such as a CMOS (Complementary Metal Oxide Semiconductor) image sensor, and the like. If the imaging element is a color CCD, the color filter 122 is not arranged in the light receiving section 120.

The fluorescence or the transmitted light entering the light receiving section 120 is collected and imaged by the imaging lens 123, and thereafter, received by the camera 121. The image of the measuring object S is thereby obtained. An analog electric signal (hereinafter referred to as light receiving signal) corresponding to the light receiving amount is output from each pixel of the imaging element of the camera 121 to the control board 170.

An A/D converter (Analog/Digital converter) (not shown) and a FIFO (First In First Out) memory are mounted on the control board 170. The light receiving signal output from the camera 121 is sampled at a constant sampling period and converted to a digital signal by the A/D converter based on a control by the PC 200. The digital signal output from the A/D converter is sequentially accumulated in the FIFO memory. The digital signals accumulated in the FIFO memory are sequentially transferred to the PC 200 as pixel data.

(2) Control System of Microscopic Imaging Device

Figure 4:
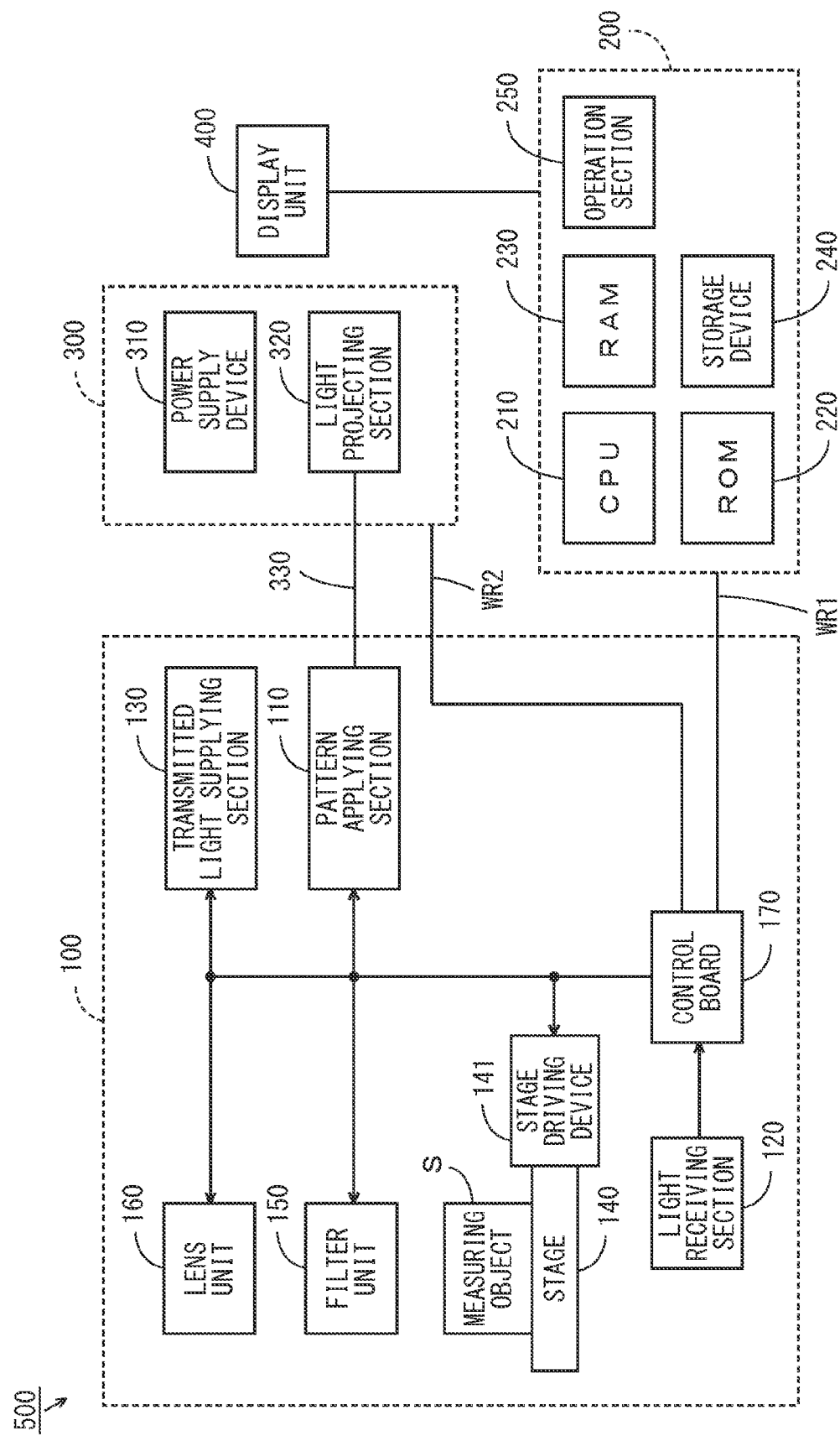
FIG. 4 is a block diagram showing a control system of the microscopic imaging device of FIG. 1.

FIG. 4 is a block diagram showing a control system of the microscopic imaging device 500 of FIG. 1. In the measurement unit 100, the control board 170 controls the operations of the pattern applying section 110, the light receiving section 120, the transmitted light supplying section 130, the stage driving device 141, the filter unit 150, and the lens unit 160 in response to a command provided from the PC 200. The control board 170 also transfers a digital signal based on the light receiving signal output from the camera 121 (FIG. 3), as described above, to the PC 200. The control board 170 also controls the operations of the power supply device 310 and the light projecting section 320 of the measurement light supplying unit 300 in response to the command from the PC 200.

The PC 200 includes a CPU (Central Processing Unit) 210, a ROM (Read Only Memory) 220, a RAM (Random Access Memory) 230, a storage device 240, and the operation section 250. The operation section 250 is configured to be operable by a user to give a command to the control board 170 of the measurement unit 100, and includes a keyboard and a pointing device. A mouse, a joy stick, or the like is used for the pointing device.

The display unit 400 is configured, for example, by an LCD panel or an organic EL (Electro Luminescence) panel. The ROM 220 stores a system program. The RAM 230 stores various types of data and also functions as a work region of the CPU 210. The storage device 240 includes a hard disk, and the like. The storage device 240 stores a control program and an image processing program of the microscopic imaging device 500. The storage device 240 is used to save various types of data such as the pixel data, and the like provided from the measurement unit 100.

Figure 5:
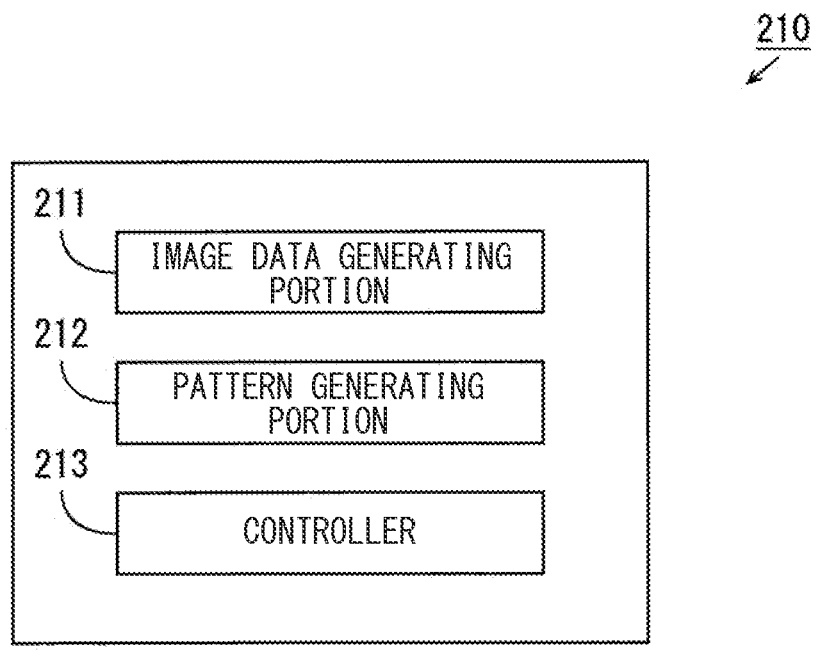
FIG. 5 is a block diagram showing a configuration of a CPU.

FIG. 5 is a block diagram showing a configuration of the CPU 210. As shown in FIG. 5, the CPU 210 includes an image data generating portion 211, a pattern generating portion 212, and a controller 213. The image data generating portion 211 generates the image data based on the pixel data provided from the measurement unit 100 by executing the control program and the image processing program. The image data is a collection of a plurality of pieces of pixel data.

The pattern generating portion 212 generates a pattern to be irradiated on the measuring object S while sequentially moving the spatial phase by a predetermined amount as a pattern of the measurement light emitted from the light modulation element 112 of FIG. 3. The controller 213 controls the light modulation element 112 through the control board 170 of FIG. 2 based on the pattern generated by the pattern generating portion 212 to move the phase of the pattern while irradiating the measuring object S with the measurement light having a predetermined pattern.

The controller 213 controls the operations of the light receiving section 120, the transmitted light supplying section 130, the stage 140, the filter unit 150, the lens unit 160, and the light projecting section 320 through the control board 170 by giving a command to the control board 170.

Furthermore, the controller 213 carries out various processing on the generated image data using the RAM 230 and displays the image based on the image data on the display unit 400.

(3) Function of Pattern Applying Section (a) Application of Spatial Pattern

Figure 6:
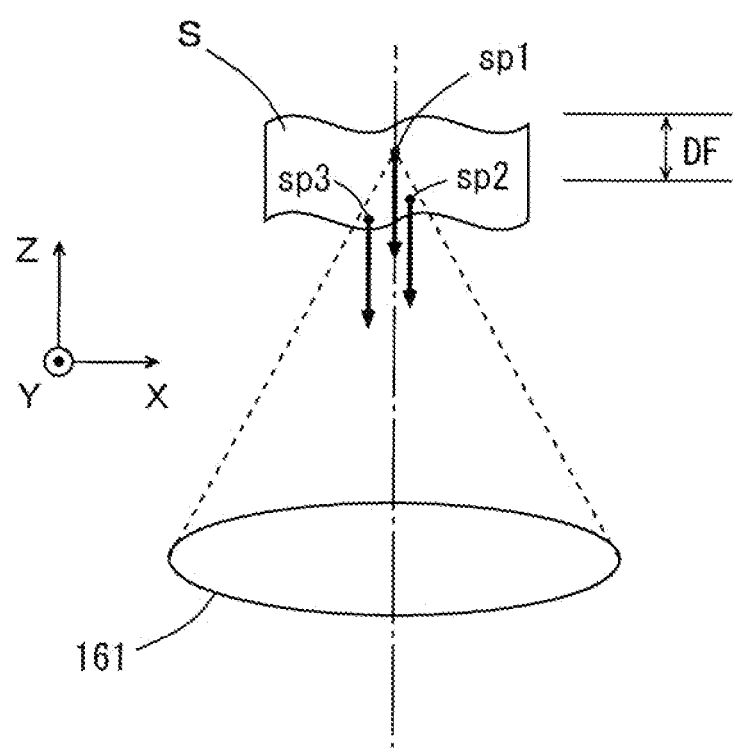
FIG. 6 is a schematic view showing fluorescence emitted from a measuring object when the measuring object is irradiated with measurement light.

FIG. 6 is a schematic view showing fluorescence emitted from the measuring object S when the measuring object S is irradiated with the measurement light. As shown in FIG. 6, when an observation target portion sp1 of the measuring object S is arranged on the focus of the objective lens 161, the measurement light passing through the objective lens 161 is collected toward the observation target portion sp1 of the measuring object S as shown with a dotted line. Thus, if the fluorescence reagent exists at the observation target portion sp1 of the measuring object S, the fluorescence is emitted from the observation target portion sp1. As shown with a thick arrow, part of the fluorescence enters the light receiving section 120 (FIG. 3) through the objective lens 161.

When the measurement light is collected at the observation target portion sp1 of the measuring object S by the objective lens 161, a fluorescence reagent existing at a position deviated from the focus of the objective lens 161 also emits fluorescence upon receiving the measurement light. In the example of FIG. 6, the fluorescence is also emitted from the portions sp2, sp3 other than the observation target portion sp1. If the portions sp2, sp3 are at positions outside a depth of field DF of the objective lens 161, the fluorescence emitted from the portions sp2, sp3 enters the light receiving section 120 as stray light.

Figure 7:
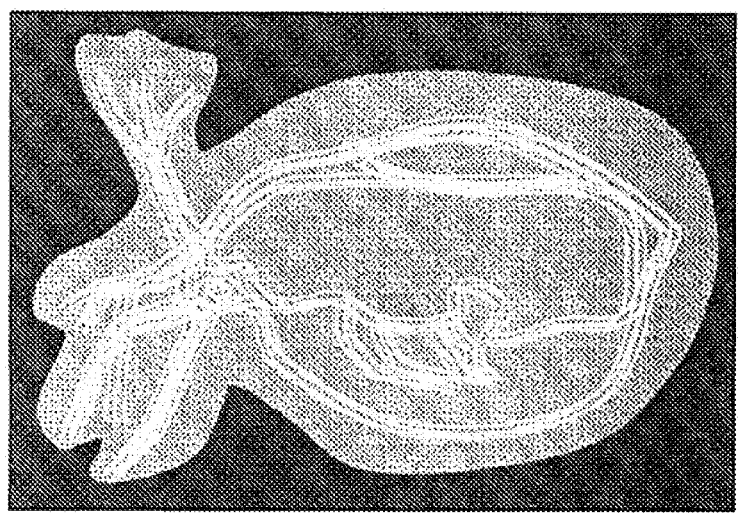
FIG. 7 is a view showing one example of a fluorescence observation image obtained by irradiating a predetermined observation range in the measuring object with uniform measurement light.

FIG. 7 is a view showing one example of a fluorescence observation image obtained by irradiating a predetermined observation range in the measuring object S with uniform measurement light. For the above reasons, when the predetermined observation range in the measuring object S is uniformly irradiated with the measurement light, the fluorescence emitted from the position outside the depth of field DF of the objective lens 161 enters the light receiving section 120 as the stray light and lowers the contrast of the fluorescence observation image as a whole, as shown in FIG. 7.

In the measurement unit 100 of the present example, the fluorescence observation that uses the patterned measurement light is carried out to obtain a fluorescence observation image of high contrast. In the following description, the fluorescence observation that uses the uniform measurement light is referred to as a normal observation, and the fluorescence observation that uses the patterned measurement light is referred to as a sectioning observation.

In the sectioning observation, a spatial phase of a predetermined pattern is moved by a constant amount while irradiating the measuring object S with the measurement light having the predetermined pattern. The measurement light having the predetermined pattern has an intensity that periodically changes in one direction (e.g., Y direction) or two directions (e.g., X direction and Y direction) on the XY plane, for example. The measurement light having a pattern is hereinafter referred to as pattern measurement light.

The pattern and the phase of the pattern measurement light are controlled by the light modulation element 112. A portion of the pattern measurement light in which the intensity is greater than or equal to a predetermined value is referred to as a bright portion, and a portion of the pattern measurement light in which the intensity is smaller than the predetermined value is referred to as a dark portion.

For the pattern measurement light, a striped measurement light having a cross-section including a plurality of linear bright portions lined parallel to one direction (e.g., X direction) and at a substantially equal interval in another direction (e.g., Y direction) orthogonal to the one direction, and a plurality of linear dark portions between the plurality of bright portions can be used.

FIGS. 8A to 8E are views showing examples of the sectioning observation method. As shown in FIGS. 8A to 8D, in the sectioning observation, the phase of the pattern of the pattern measurement light is moved by a constant amount so that the entire irradiation range of the measurement light is irradiated at least once with the bright portion of the pattern measurement light (striped measurement light in the present example). Furthermore, the fluorescence emitted from the measuring object S is detected each time the phase of the pattern is moved by a constant amount. A plurality of pieces of image data of the measuring object S are thereby generated.

The image data obtained when the measuring object S is irradiated with the pattern measurement light is referred to as pattern image data. An image based on the pattern image data is referred to as a pattern image.

In each piece of pattern image data, the pixel data corresponding to the bright portion of the pattern measurement light has a high value (luminance value), and the pixel data corresponding to the dark portion of the pattern measurement light has a low value (luminance value). Thus, as shown with arrows in FIGS. 8A to 8D, the portion of the pixel corresponding to the bright portion of the pattern measurement light is bright, and the portion of the pixel corresponding to the dark portion of the pattern measurement light is dark in each pattern image.

Each pattern image is subjected to the influence of stray light. The following processes are executed to obtain image data in which the influence of the stray light is removed.

First, a component (hereinafter referred to as focusing component) representing the extent of bright and dark difference is calculated using the values of the plurality of pieces of pixel data for every pixel from the plurality of pieces of pattern image data. The pixels having the focusing component are connected to generate the image data. The image data generated in such a manner is referred to as sectioning image data. An image based on the sectioning image data is referred to as a sectioning image.

In the pattern image data generated using the striped measurement light, the focusing component is, for example, a difference between a maximum value (maximum luminance value) and a minimum value (minimum luminance value) of the pixel data, or a standard deviation of the values of the pixel data.

Figure 8A:
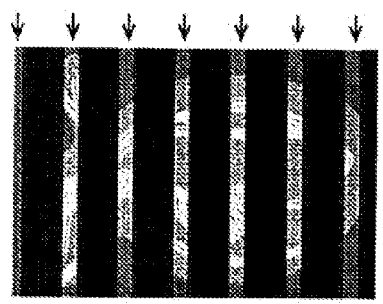
FIGS. 8A to 8E are views showing examples of a sectioning observation method.
Figure 8B:
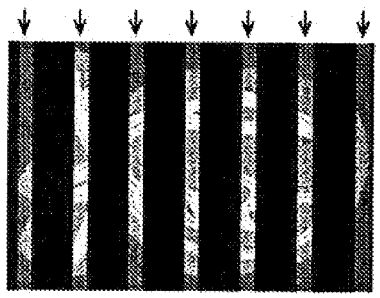
Figure 8C:
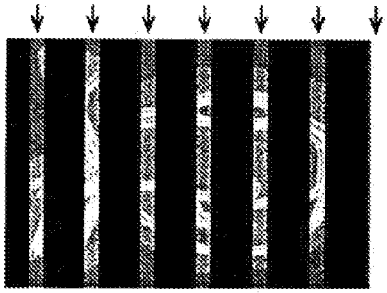
Figure 8D:
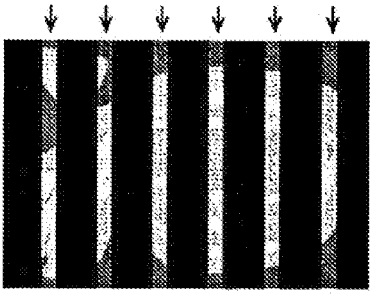
Figure 8E:
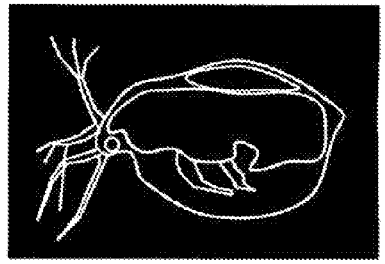

In the present example, the difference in the pixel data of the pattern image data of when the bright portion and the dark portion of the pattern measurement light are irradiated is calculated as the focusing component for each pixel. The calculated focusing components for all the pixels are connected to generate the sectioning image data. The value of the pixel data of the pattern image data of when the dark portion of the pattern measurement light is irradiated corresponds to the component of the stray light for each pixel. Therefore, the sectioning image data in which the influence of stray light is removed can be obtained. As a result, the fluorescence observation image (sectioning image) of high contrast in which the influence of stray light is removed can be obtained, as shown in FIG. 8E.

In the following description, as opposed to the sectioning image data and the sectioning image, the image data obtained in the normal observation is referred to as normal image data, and the fluorescence observation image based on the normal image data is referred to as a normal image.

For the pattern measurement light, a one-dimensional sine wave measurement light having a cross-section including a pattern parallel to the X direction and in which the intensity changes in a sine wave form in the Y direction, for example, can be used for the striped measurement light. Alternatively, for the pattern measurement light, a two-dimensional sine wave measurement light having a cross-section including a pattern in which the intensity changes in the sine wave form in the X direction and in the Y direction, for example, can be used for the striped measurement light. In the pattern image data generated using the one-dimensional sine wave measurement light or the two-dimensional sine wave measurement light, the focusing component is the amplitude (peak to peak) of the pixel data, for example.

Alternatively, for the pattern measurement light, a dot measurement light having a cross-section including a plurality of dot-like bright portions lined at a substantially equal interval in the X direction and the Y direction can be used in place of the striped measurement light. In the pattern image data generated using the dot measurement light, the focusing component is a difference between the maximum value (maximum luminance value) and the minimum value (minimum luminance value) of the pixel data, or the standard deviation of the values of the pixel data, for example.

In the present embodiment, the user can set an ROI (Region of Interest) using the operation section 250 of FIG. 4. In this case, the pattern applying section 110 is controlled such that only the portion of the measuring object S corresponding to the ROI is irradiated with the measurement light, and the other portions are not irradiated with the measurement light.

When using the digital zoom function of the camera 121, the ROI is often set small. Thus, the sectioning image data or the normal image data can be generated at high speed. If the measurement unit 100 is the fluorescence microscope, the fluorescence reagent of the measuring object S loses color by irradiating the measuring object S with the measurement light. The activity of the cells lowers when the measuring object S is a biological sample. Thus, it is effective to irradiate only the requisite minimum portion with the measurement light.

(b) Application of Temporal Pattern

The light modulation element 112 of the pattern applying section 110 can apply a temporal pattern to the measurement light in addition to applying the spatial pattern to the measurement light as described above. Thus, the light modulation element 112 functions as a light shielding element for switching guiding and shielding of the measurement light, and also functions as a dimming element for adjusting the brightness of the image displayed on the display unit 400.

The timing of emitting light by the pattern applying section 110 is synchronized with the light receiving timing by the light receiving section 120. The CPU 210 controls the light receiving timing by the light receiving section 120 and controls the light guiding period and the light shielding period of the pattern applying section 110 based on the timing signal.

FIGS. 9A to 9D are views showing examples of the measurement light having a temporal pattern. FIGS. 10A to 10D are views showing examples of a normal image based on the normal image data generated using the measurement light of FIGS. 9A to 9D. In FIGS. 9A to 9D, the horizontal axis indicates time, and the vertical axis indicates the intensity of the measurement light. FIGS. 10A to 10D shows the normal image based on the normal image data generated when the measuring object S is irradiated with the measurement light of FIGS. 9A to 9D, respectively.

Figure 9A:
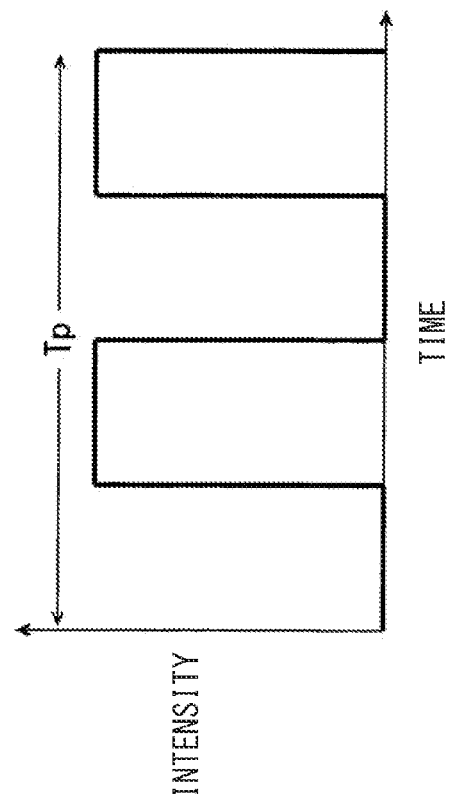
FIGS. 9A to 9D are views showing examples of the measurement light having a temporal pattern.
Figure 9B:
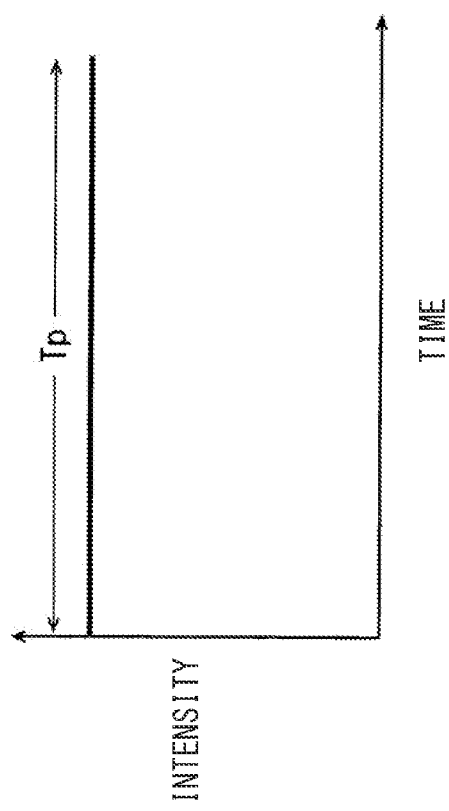
Figure 10A:
FIGS. 10A to 10D are views showing examples of a normal image based on normal image data generated using the measurement light of FIGS. 9A to 9D.
Figure 10B:
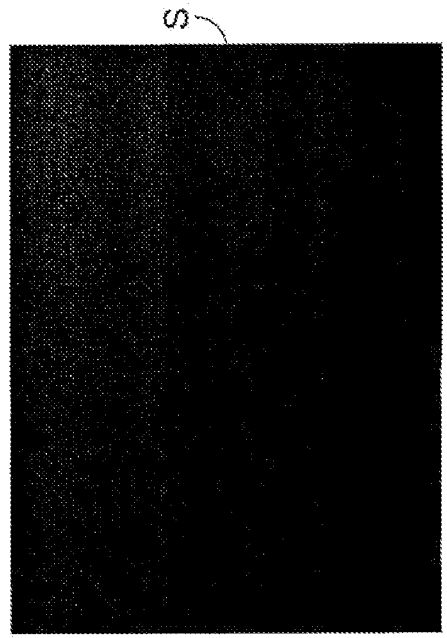

In the example of FIG. 9A, the light guiding state is maintained during a constant period Tp corresponding to the light receiving period of the light receiving section 120. In this case, as shown in FIG. 10A, the normal image data showing bright normal image is generated. In the example of FIG. 9B, the light guiding state and the light shielding state are alternately repeated during the constant period Tp. In the period Tp, the sum of the light guiding period and the sum of the light shielding period are substantially equal. In this case, as shown in FIG. 10B, the normal image data showing a darker normal image than the normal image of FIG. 10A is generated.

Figure 9C:
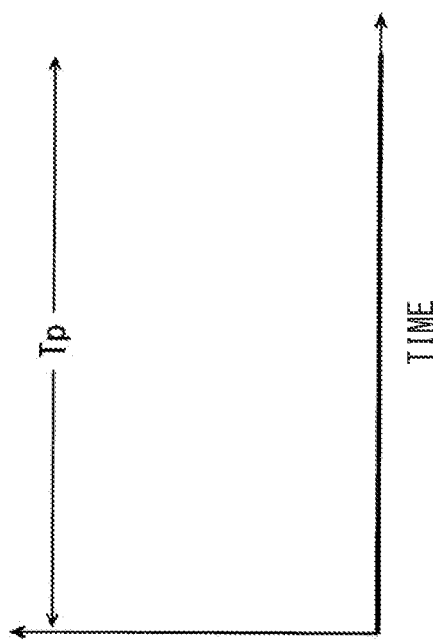
Figure 9D:
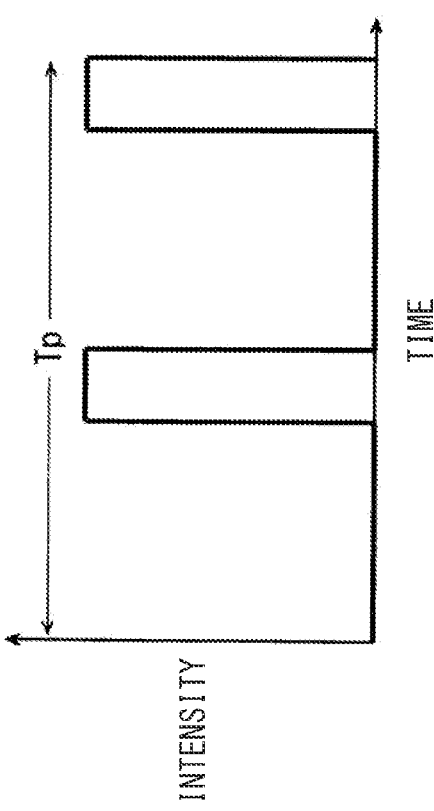
Figure 10C:
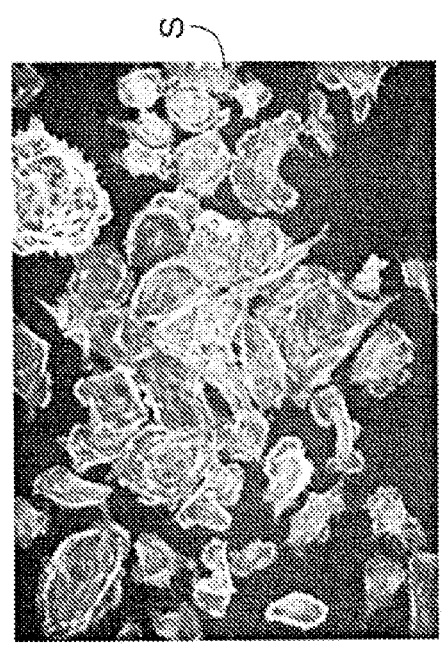
Figure 10D:
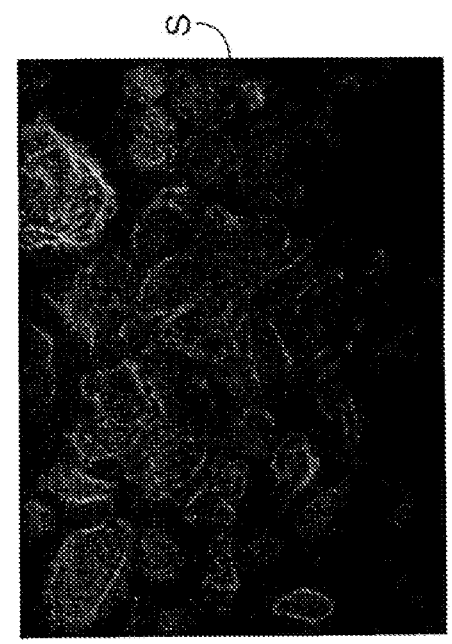

In the example of FIG. 9C, the light guiding state and the light shielding state are alternately repeated during the constant period Tp. The sum of the light guiding period is shorter than the sum of the light shielding period in the period Tp. In this case, as shown in FIG. 10C, the normal image data showing a darker normal image than the normal image of FIG. 10B is generated. In the example of FIG. 9D, the light shielding state is maintained during the constant period Tp. In this case, as shown in FIG. 10D, the normal image data showing an entirely black normal image is generated.

Thus, the brightness of the normal image can be linearly adjusted by controlling the ratio (duty ratio) of the sum of the light guiding period to the sum of the light shielding period in the constant period Tp.

Figure 11:
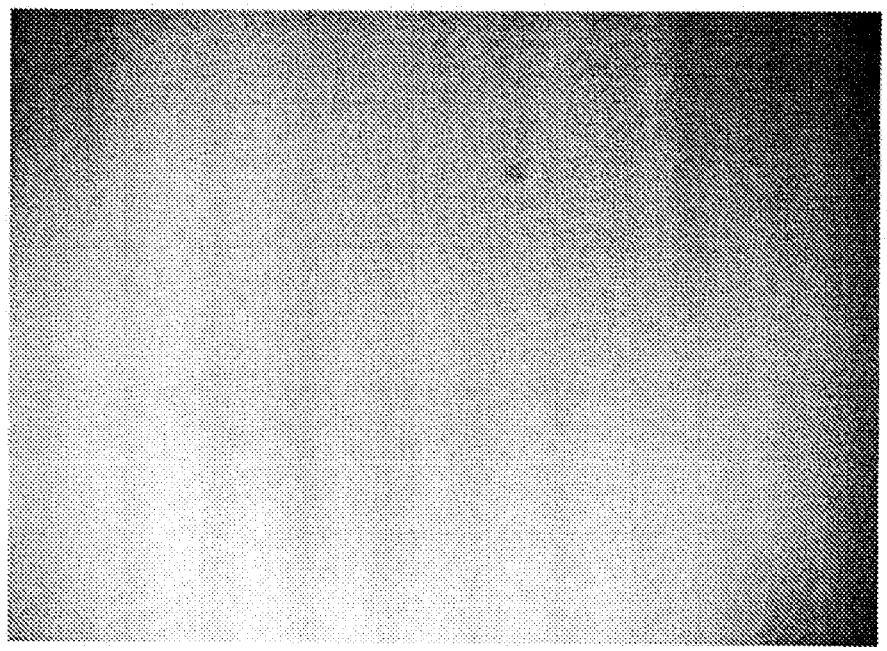
FIG. 11 is a view showing an example of a normal image based on normal image data generated using the uniform measurement light.

FIG. 11 is a view showing an example of a normal image based on the normal image data generated using the uniform measurement light. Even if the light receiving section 120 receives the uniform measurement light, the values of the plurality of pieces of pixel data of the generated normal image data may not become uniform. This is because the intensity of the measurement light is not essentially uniform, the irradiation profile (intensity distribution) of the measurement light on the measuring object S by the design of the optical system is not uniform, the vignetting (lowering of peripheral light amount) by the optical element, and the like.

Thus, as shown in FIG. 11, a shading phenomenon in which a part of the normal image becomes bright or portions of the four corners of the image become dark occurs. Thus, in the present embodiment, the duty ratio is controlled for each of a plurality of modulation pixels of the light modulation element 112 so that the brightness of the plurality of pixels of the normal image becomes uniform. The normal image data with suppressed shading phenomenon thus can be generated.

The light guiding state of FIG. 9A and the light shielding state of FIG. 9D are switched, so that the guiding and the shielding of the uniform measurement light can be switched at higher speed and lower vibration than when the light shielding mechanism 323 of FIG. 3 is used. In particular, if the measurement unit 100 is the fluorescence microscope, the fluorescence reagent of the measuring object S loses color as the measuring object S is irradiated with the measurement light for a long period of time. It is thus effective to switch between light projection and light shielding of the measurement light at high speed. Furthermore, the measuring object S is prevented from being irradiated with the measurement light within a non-exposure time of the light receiving section 120, so that the unnecessary color loss of the fluorescence reagent of the measuring object S can be reduced.

In the fluorescence microscope, the fluorescence is emitted from various fluorescence reagents applied to the measuring object S, and thus the measurement light includes wavelength components extending over a wide band from the ultraviolet region to the near infrared region. If the measurement light having a wavelength component of the ultraviolet region or the near infrared region enters to the light modulation element 112 for a long period of time, this may damage the light modulation element 112.

Figure 12:
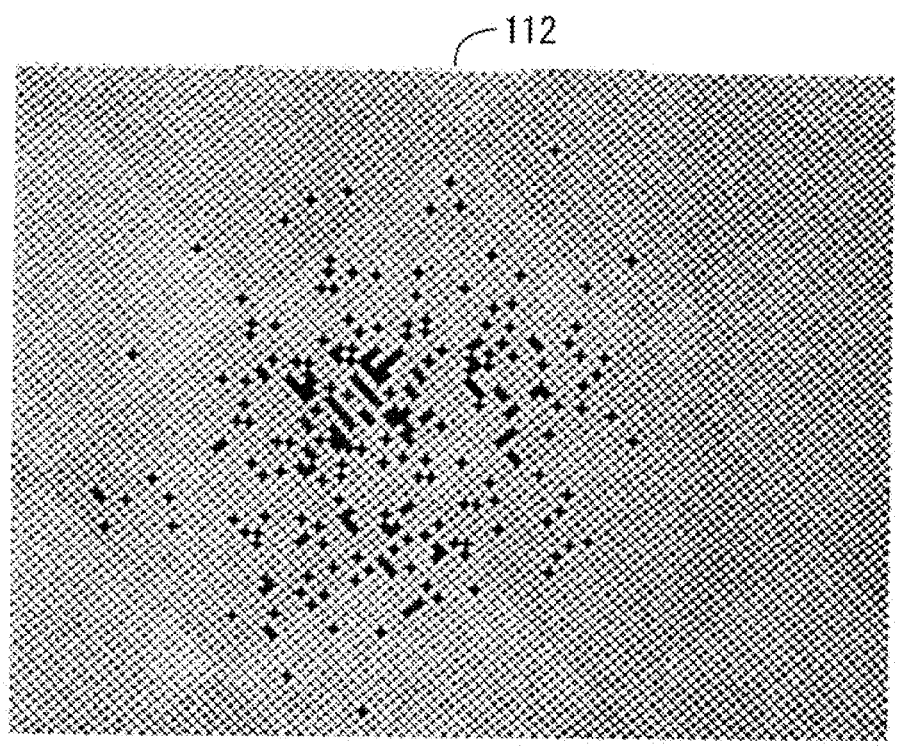
FIG. 12 is a view showing an image in which a part of a light modulation element is enlarged.

FIG. 12 is a view showing an image in which a part of the light modulation element 112 is enlarged. In the example of FIG. 12, some of the plurality of modulation pixels is defective pixels due to the damage of the light modulation element 112. In the present embodiment, therefore, the measurement light is shielded by the light shielding mechanism 323 when shielding the measurement light for a relatively long period of time such as when carrying out transmissive observation, carrying out preview display, to be described later, or the like. The damage of the light modulation element 112 thus can be minimized.

(4) Structure of Internal Housing

Figure 13:
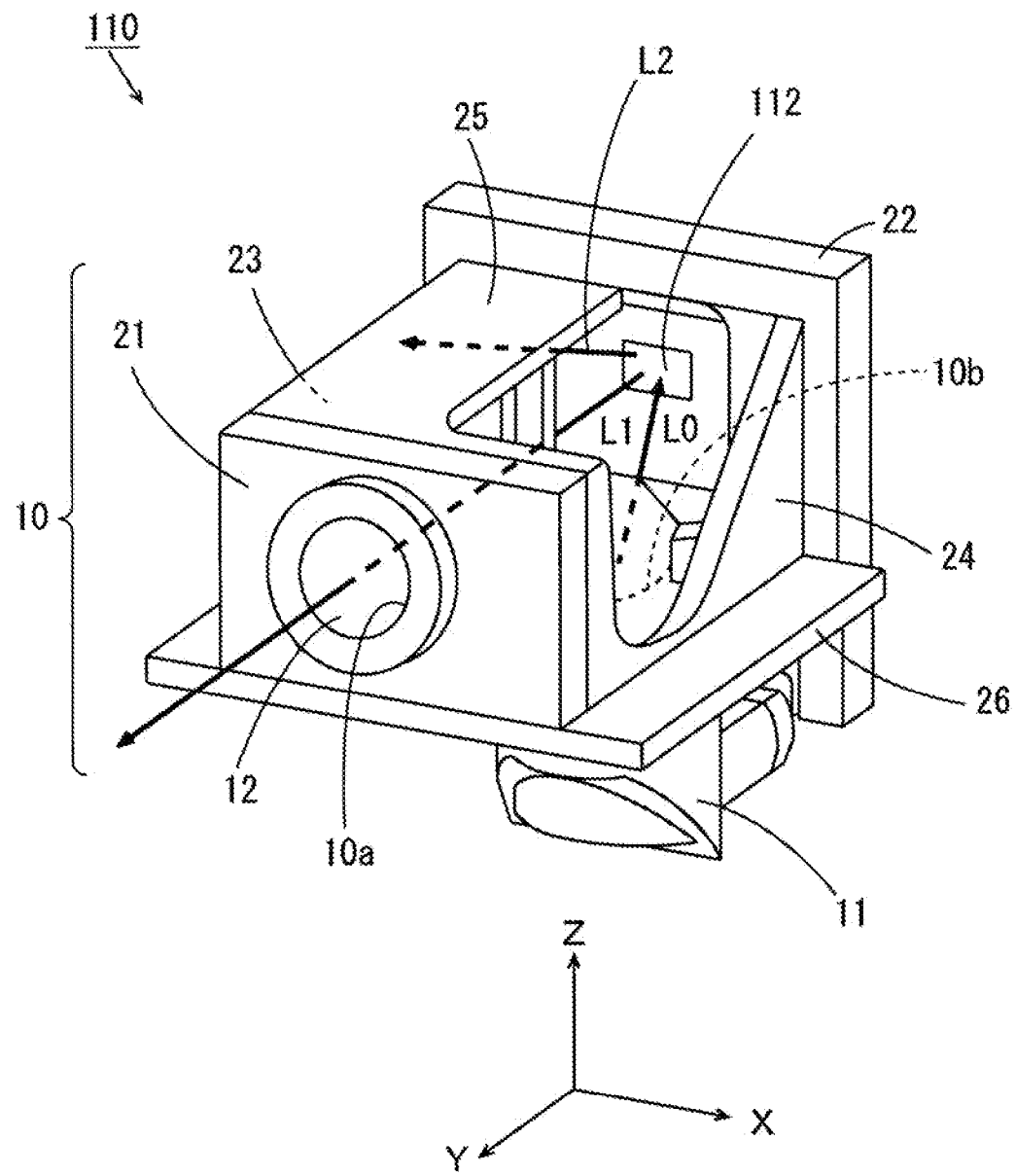
FIG. 13 is an outer appearance perspective view of a pattern applying section.

The internal housing 10 of the pattern applying section 110 of FIG. 3 will now be described. FIG. 13 is an outer appearance perspective view of the pattern applying section 110. In FIG. 13 is shown a state in which a part of the internal housing 10 is cut out.

As shown in FIG. 13, the internal housing 10 includes a front surface portion 21, a rear surface portion 22, a one-side surface portion 23, the other-side surface portion 24, an upper surface portion 25, and a lower surface portion 26. Each of the front surface portion 21, the rear surface portion 22, the one-side surface portion 23, the other-side surface portion 24, the upper surface portion 25, and the lower surface portion 26 is a rectangular plate-shaped member, and are coupled to each other.

An emission opening 10a is formed at the central portion of the front surface portion 21. The light projection lens 12 is attached to the emission opening 10a. An incident opening 10b is formed at a central portion of the lower surface portion 26. The light guiding component supporting case 11 is attached to the lower surface portion 26 so as to block the incident opening 10b. In FIG. 13, the measurement light entering the light modulation element 112 through the light guiding member 330 of FIG. 3 is shown with a thick arrow L0.

During the sectioning observation, the light modulation element 112 reflects the measurement light guided from the light guiding member 330 toward the emission opening 10a as shown with a thick arrow L1 of FIG. 13. The bright portion of the pattern measurement light is thereby generated. The light modulation element 112 also reflects the measurement light guided from the light guiding member 330 toward a position deviated from the emission opening 10a as shown with a thick arrow L2 of FIG. 13. The dark portion of the pattern measurement light is thereby generated. The light reflected to the position deviated from the emission opening 10a is unnecessary light. The unnecessary light is reflected at the inner surface of the internal housing 10, and thus is prevented from being directly emitted to the outside of the internal housing 10 from the emission opening 10a.

In this case, the unnecessary light is suppressed from leaking out to the outside of the internal housing 10. The unnecessary light thus does not reach the space including the stage 140 and the light receiving section 120. Therefore, the unnecessary light is prevented from entering the light receiving section 120, and the lowering in the contrast of the sectioning image by the stray light is prevented.

As described above, in the pattern applying section 110, the emission opening 10*a* and the incident opening 10*b* of the internal housing 10 are blocked by the light projection lens 12 and the light guiding component supporting case 11, respectively, with the light modulation element 112 accommodated in the internal housing 10. Thus, even if dust enters the external housing 101, such dust is prevented from attaching to the light modulation element 112. The dust is hence prevented from appearing in the sectioning image and the normal image of the measuring object S.

As a result, a highly reliable image of the measuring object S can be obtained. Furthermore, the enlargement and higher cost of the measurement unit 100 are suppressed since dust prevention of the entire external housing 101 does not need to be carried out. Further, the transmissive device such as the LCD, and the like may be used for the light modulation element 112 in place of the reflective device such as the DMD, the LCOS, or the like.

(5) Replacement Work of Measuring Object, Objective Lens, and Filter Cube

Figure 14A:
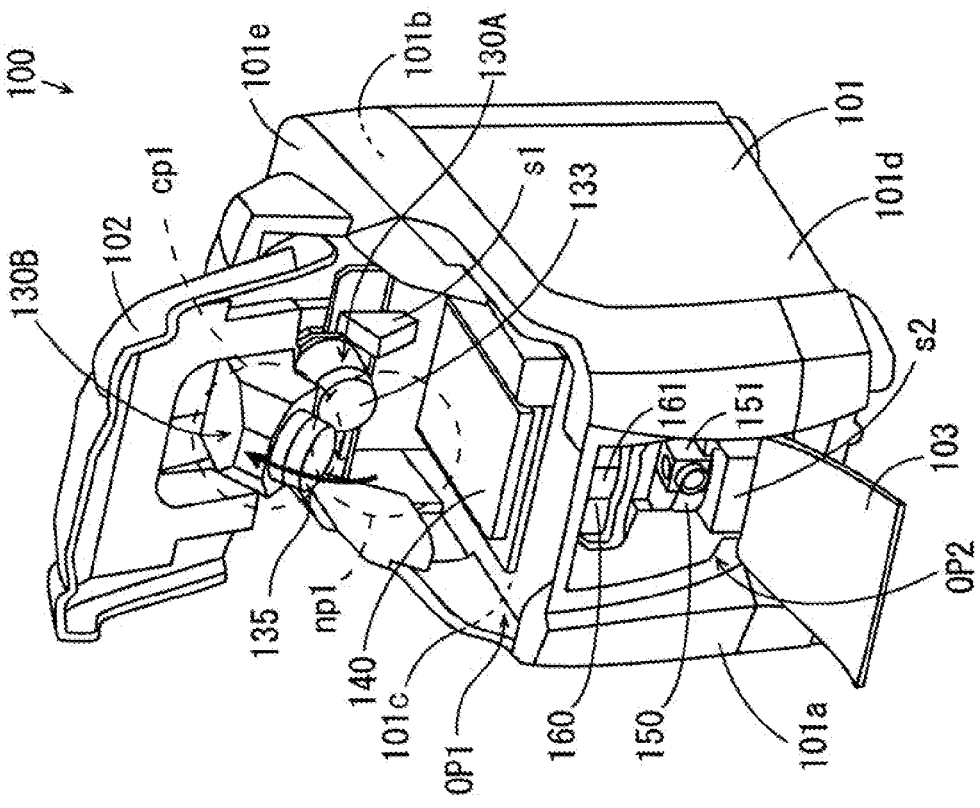
FIGS. 14A and 14B are outer appearance perspective views showing a state of the measurement unit in replacement work of the measuring object, a objective lens, and a filter cube.
Figure 14B:
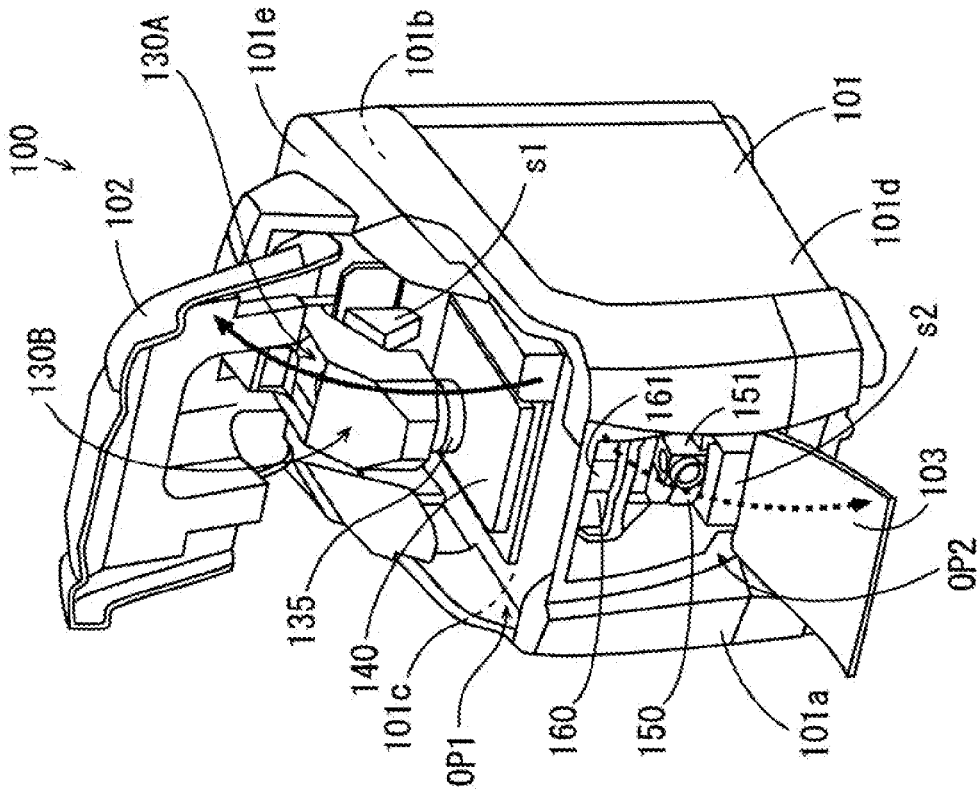

FIGS. 14A and 14B are outer appearance perspective views showing a state of the measurement unit 100 in the replacement work of the measuring object S, the objective lens 161, and the filter cube 151. As shown in FIG. 14A, an upper opening OP1 is formed in the external housing 101 of the measurement unit 100. The upper surface lid 102 that can open and close the upper opening OP1 is attached to a part of an upper surface portion 101*e* of the external housing 101 by way of a hinge 10211 (FIG. 2).

In the replacement work of the measuring object S mounted on the stage 140, the upper surface lid 102 is opened as shown with a thick arrow in FIG. 14A. Thereafter, as shown with a thick arrow in FIG. 14B, the swinging portion 130B of the transmitted light supplying section 130 is manually swung from the regular position np1 to the separated position cp1. The user then can easily carry out the replacement work of the measuring object S through the upper opening OP1 from the front side of the measurement unit 100.

A swinging portion detector s1 is arranged in the vicinity of the fixing portion 130A. The swinging portion detector s1 is a magnetic sensor including a magnet and a Hall element, for example, and detects whether or not the swinging portion 130B is at the regular position np1 and provides the detection result to the control board 170 (FIG. 2). If the swinging portion 130B is not at the regular position np1, the control board 170 causes the light shielding mechanism 323 (FIG. 3) of the light projecting section 320 (FIG. 3) to be in the light shielding state and also stops the supply of power from the power supply device 310 to the transmissive light source 131 (FIG. 3). Thus, the irradiation with the measurement light on the stage 140, and the emitting of the transmitted light toward the front side of the measurement unit 100 from the fixing portion 130A are prevented.

If the swinging portion 130B is not at the regular position np1, the control board 170 may control the light modulation element 112 of the pattern applying section 110 to prevent the measurement light from being applied on the stage 140 instead of causing the light shielding mechanism 323 (FIG. 3) to be in the light shielding state.

A front opening OP2 is further formed in the external housing 101. The front surface lid 103 that can open and close the front opening OP2 is attached to a part of the front surface portion 101*a* of the external housing 101 by way of a hinge 103H (FIG. 2).

In the replacement work of the objective lens 161 attached to the lens turret 162 of FIG. 3, the front surface lid 103 is manually opened as shown with a thick dotted arrow in FIG. 14A. Furthermore, in the replacement work of the filter cube 151 attached to the filter turret 152 of FIG. 3 as well, the front surface lid 103 is manually opened. In these cases, the user can easily carry out the replacement work of the objective lens 161 and the filter cube 151 through the front opening OP2 from the front side of the measurement unit 100.

A front surface lid detector s2 is arranged in the vicinity of the front surface lid 103. The front surface lid detector s2 is a magnetic sensor including a magnet and a Hall element, for example, and detects the open/close state of the front surface lid 103 and provides the detection result to the control board 170. The control board 170 switches the light shielding mechanism 323 (FIG. 3) of the light projecting section 320 (FIG. 3) from the light guiding state to the light shielding state when the front surface lid 103 is switched from the closed state to the opened state based on the detection result. The control board 170 also stops the supply of power from the power supply device 310 to the transmissive light source 131 (FIG. 3). Thus, the emitting of the measurement light from the pattern applying section 110 (FIG. 3) toward the filter unit 150 and the emitting of the transmitted light from the transmitted light supplying section 130 (FIG. 3) toward the filter unit 150 are prevented.

The control board 170 may control the light modulation element 112 of the pattern applying section 110 to prevent the measurement light from being emitted toward the filter unit 150 instead of causing the light shielding mechanism 323 (FIG. 3) to be in the light shielding state when the front surface lid 103 is switched from the closed state to the opened state.

Thus, the measurement light and the transmitted light are prevented from leaking out to the outside of the external housing 101. Therefore, the measurement light and the transmitted light are prevented from entering the eyes of the user.

The upper surface lid 102 and the front surface lid 103 are manually closed by the user. In this case, the light is prevented from entering the measuring object S on the stage 140 and the light receiving section 120 from the outside of the external housing 101. A space including the measuring object S mounted on the mounting surface of the stage 140 and the light receiving section 120 is thus in a dark room state. Therefore, only the fluorescence emitted from the measuring object S can enter the light receiving section 120 during the fluorescence observation.

(6) Display Content of Display Unit

When the transmitted light emitted from the transmitted light supplying section 130 of FIG. 2 is transmitted through the measuring object S and received by the light receiving section 120, the image data of the measuring object S is generated. Hereinafter, the image data of the measuring object S generated using the transmitted light is referred to as transmission image data. An image based on the transmission image data is referred to as a transmission image.

Figure 15:
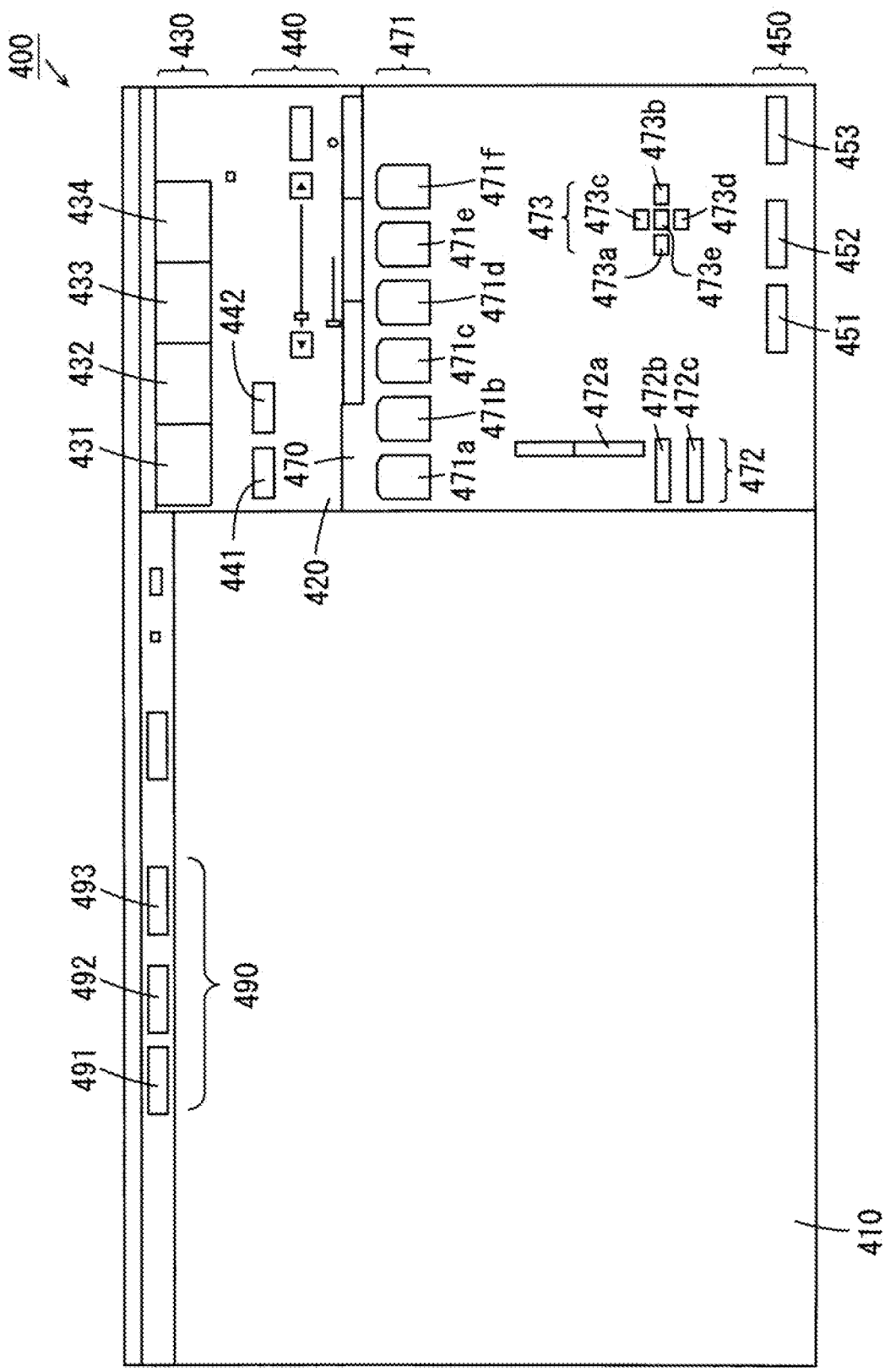
FIG. 15 is a view showing a display example of a display unit.

FIG. 15 is a view showing a display example of the display unit 400. As shown in FIG. 15, an image display region 410 and a setting display region 420 are arranged in the display unit 400 so as to be next to each other. In the image display region 410 are displayed various images such as the pattern image, the sectioning image, the normal image, the transmission image, or the like. Specifically, the image display region 410 is configured to selectively or simultaneously execute the normal display and the preview display.

The normal display is a method of displaying the pattern image, the sectioning image, the normal image, the omni-focus image, or the like based on the already generated image data. In the normal display, a plurality of images are displayed in a superimposed manner in the image display region 410 based on the already generated image data.

The preview display is a method of displaying the pattern image or the sectioning image based on the image data generated when the measurement condition is changed. The measurement condition includes the type of pattern of the measurement light, the number of imaging, the movement amount of the phase of the pattern measurement light, the widths of the bright portion and the dark portion of the pattern measurement light, and the space period of the phase of the pattern measurement light. The number of imaging is the number of generations of the pattern image data.

The measurement condition includes the visual field of the light receiving section 120, the exposure time of the light receiving section 120, the gain of the light receiving section 120, the number of binning in the image data, and the intensity of the fluorescence (measurement light). The number of binning refers to the number of pieces of pixel data coupled in the binning process of pseudo coupling the plurality of pieces of pixel data to be handled as one piece of pixel data.

In the preview display, the measuring object S is again irradiated with the measurement light only when the measurement condition is changed. For example, when the type of pattern, the movement amount of the phase of the pattern measurement light, the width of the bright portion or the space period of the phase, the exposure time of the light receiving section 120, the number of binning, or the like is changed, the measuring object S is again irradiated with the measurement light. Alternatively, when the digital zoom function of the camera 121 is operated or when the stage 140, the filter unit 150, or the lens unit 160 is operated, the measuring object S is again irradiated with the measurement light.

Thus, the pattern image or the sectioning image data is generated based on the received fluorescence. As a result, the pattern image or the sectioning image displayed in the image display region 410 is updated.

If the measurement condition is not changed, the measuring object S does not need to be irradiated with the measurement light again, and hence the CPU 210 controls the light modulation element 112 to shield the irradiation with the measurement light on the measuring object S. Thus, the unnecessary loss of color of the fluorescence reagent that occurs when the measuring object S is continuously irradiated with the measurement light can be reduced.

In the present embodiment, the irradiation and the shielding of the irradiation with the measurement light on the measuring object S can be switched at high speed by the light modulation element 112. Therefore, a plurality of pieces of pattern image data can be generated at high speed. The sectioning image data generated by the plurality of pieces of pattern image data thus can be generated at high speed. As a result, the sectioning image of when the measurement condition is changed can be preview displayed with high responsiveness.

In the preview display, the setting may be made to generate the pattern image data with a large number of binning, for example. In this case, the pattern image data and the sectioning image data can be generated at higher speed.

Thus, in the preview display, the pattern image or the sectioning image can be displayed at higher speed. The user can select the appropriate measurement condition easily and in a short period of time while looking at the preview displayed pattern image or sectioning image.

The shielding of the measurement light to the measuring object S is carried out at high speed by switching the light modulation element 112 to the light shielding state, but instead, may be carried out by switching the light shielding mechanism 323 of the light projecting section 320 of FIG. 4 to the light shielding state. Alternatively, after a constant time has elapsed when the light modulation element 112 is in the light shielding state, the light shielding mechanism 323 may be switched to the light shielding state. The damages of the light modulation element 112 thus can be minimized. When the measurement condition is changed the next time, the light modulation element 112 and the light shielding mechanism 323 are switched to the light guiding state so that the measuring object S can be irradiated with the measurement light.

When displaying the pattern image in the image display region 410, the CPU 210 controls the light modulation element 112 so that the measuring object S is irradiated with the measurement light in which the phase of the pattern is moved by a constant amount each time the measurement condition is changed. In this case, the measurement light is prevented from being applied only on a specific portion of the measuring object S. Thus, the color loss of only the fluorescence reagent at the specific portion of the measuring object S is prevented.

The user observes the measuring object S through the following procedure, for example. With the measuring object S applied with a plurality of fluorescence reagents mounted on the stage 140, the user first carries out the transmissive observation of the measuring object S. The user then checks the shape of the measuring object S and sets various measurement conditions for carrying out the fluorescence observation.

Thereafter, the user carries out the sectioning observation or the normal observation. With the start of the sectioning observation or the normal observation, the light shielding mechanism 323 of FIG. 3 is maintained in the light guiding state, and the measuring object S is irradiated with the measurement light.

When the measurement condition is not changed, the measuring object S does not need to be irradiated with the measurement light for a long period of time. Thus, if the measurement condition is not changed continuously for a predetermined period after the sectioning image data or the normal image data is generated, the control board 170 controls the light modulation element 112 of the pattern applying section 110 to shield the irradiation with the measurement light on the measuring object S. The unnecessary color loss of the fluorescence reagent that occurs when the measuring object S is continuously irradiated with the measurement light thus can be reduced.

Thereafter, the user carries out the analysis of the sectioning image data or the normal image data obtained by the sectioning observation or the normal observation. With the start of the analysis of the sectioning image data or the normal image data, the light shielding mechanism 323 of FIG. 3 is switched from the light guiding state to the light shielding state, and the entering of the measurement light to the light modulation element 112 is stopped.

As described above, the light shielding mechanism 323 of FIG. 3 is maintained in the light shielding state during the analysis of the sectioning image data or the normal image data or during the transmissive observation. The degradation of the light modulation element 112 caused by the entering of the measurement light is thus suppressed, and longer lifespan of the light modulation element 112 is realized.

Figure 16A:
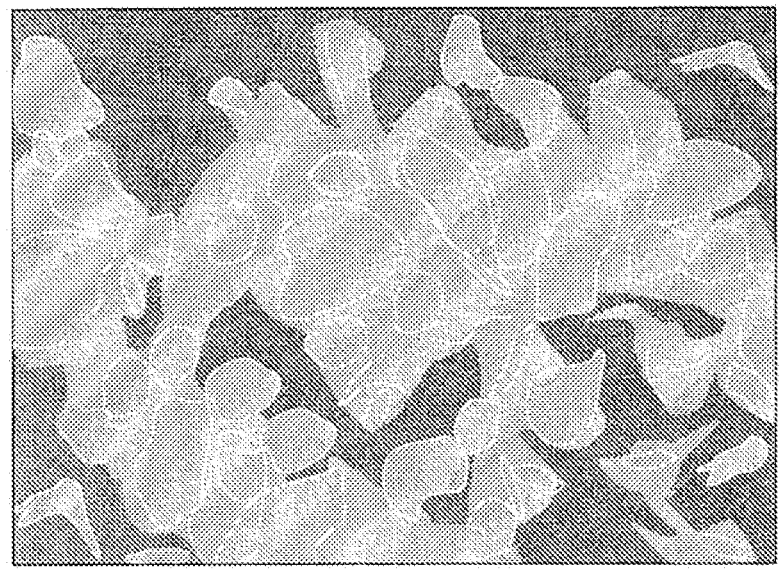
FIGS. 16A and 16B are views showing examples of an observation image displayed in an image display region of FIG. 15.

FIGS. 16A to 19 are views showing examples of the observation image displayed in the image display region 410 of FIG. 15. FIG. 16A shows an example of the sectioning image of when the measuring object S is irradiated with the measurement light having an absorption wavelength of the GFP, and FIG. 16B shows an example of the sectioning image of when the measuring object S is irradiated with the measurement light having an absorption wavelength of the Texas Red. FIG. 17A shows an example of a normal image of when the measuring object S is irradiated with the measurement light having an absorption wavelength of the DAPI, and FIG. 17B shows an example of a transmission image obtained by the phase difference observation using the transmitted light.

When a multiple-photographing button 452 of FIG. 15 is operated, for example, an image in which 2 or more images of the images of FIGS. 16A and 16B and FIGS. 17A and 17B are superimposed is displayed in the image display region 410.

Figure 16B:
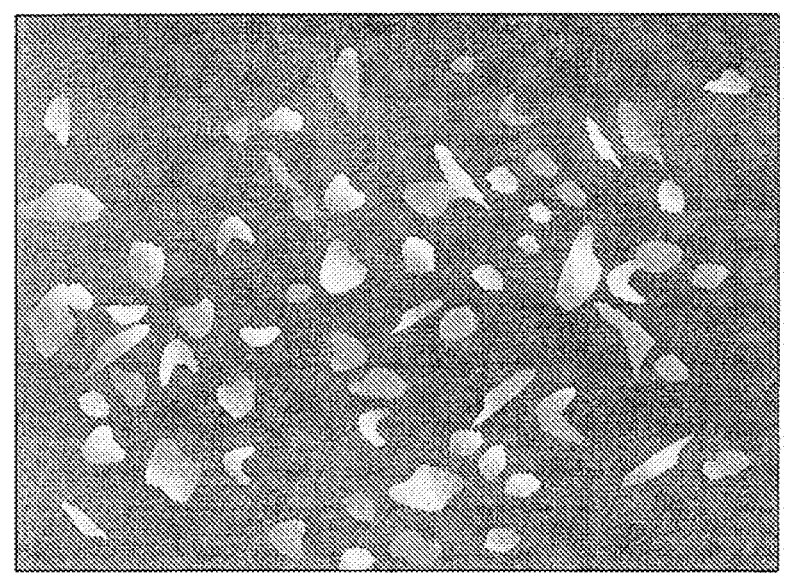
Figure 17A:
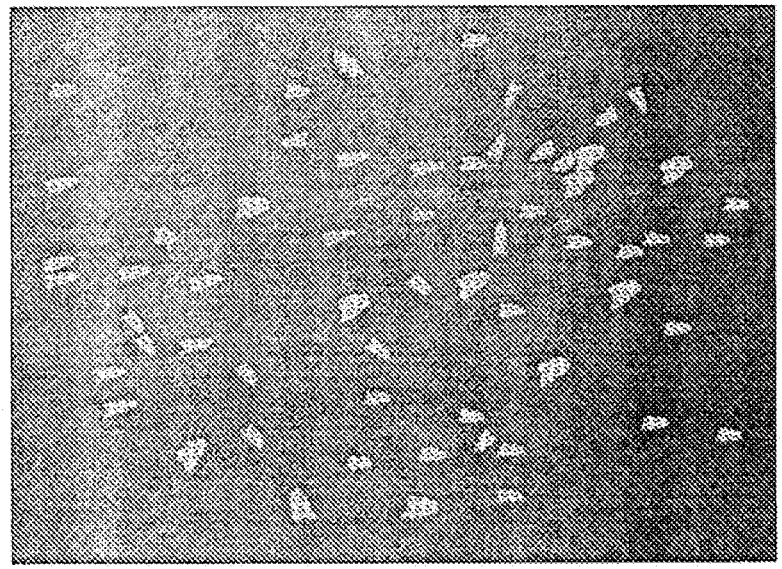
FIGS. 17A and 17B are views showing examples of the observation image displayed in the image display region of FIG. 15.
Figure 17B:
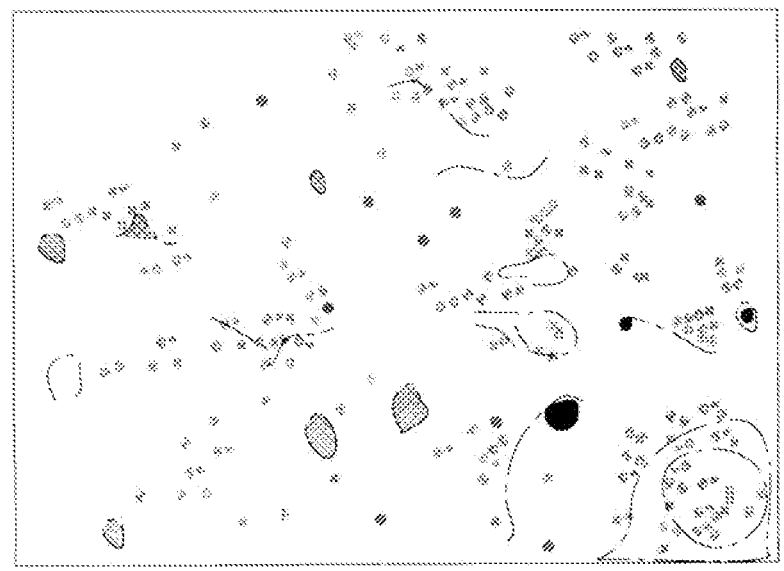
Figure 18A:
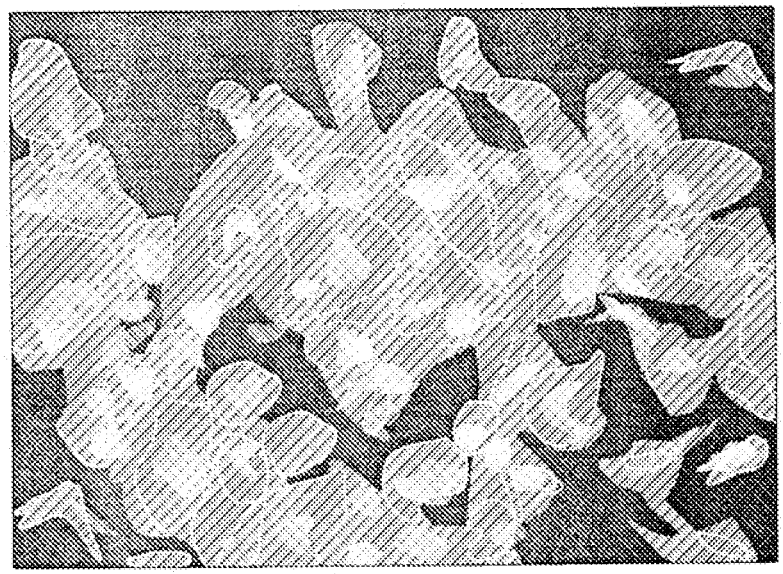
FIGS. 18A and 18B are views showing examples of the observation image displayed in the image display region of FIG. 15.
Figure 18B:
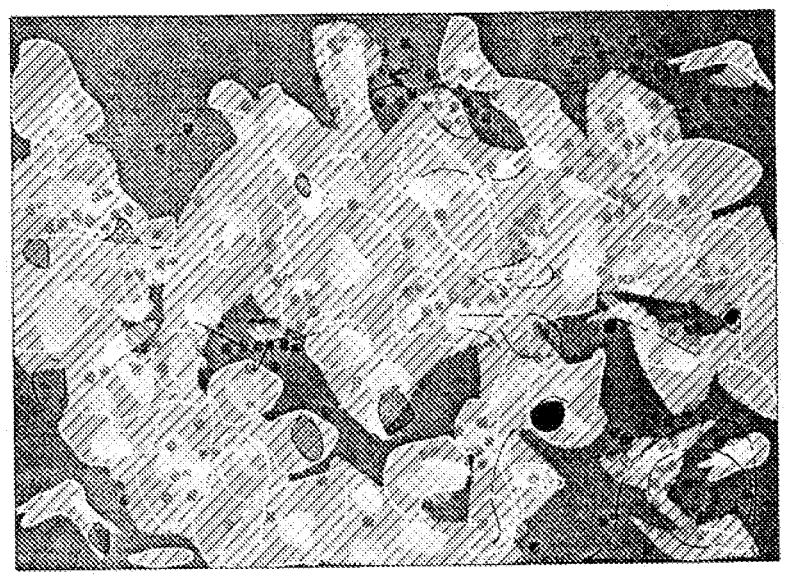
Figure 19:
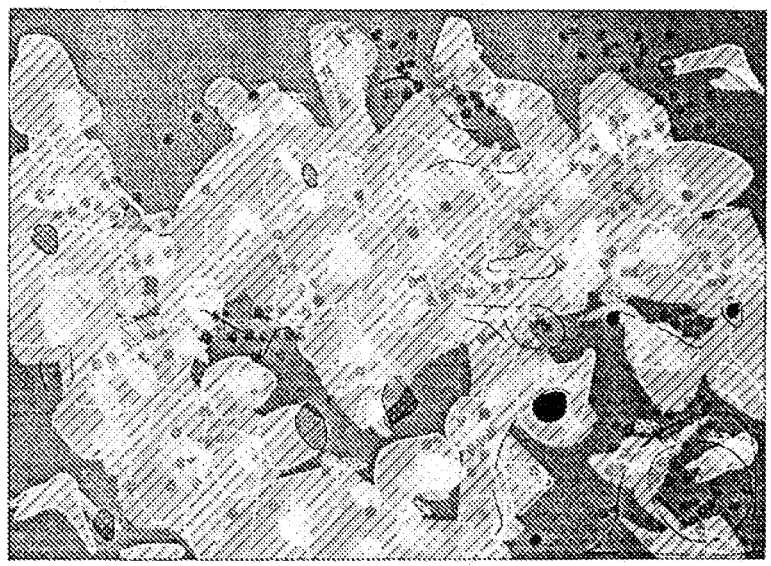
FIG. 19 is a view showing an example of the observation image displayed in the image display region of FIG. 15.

In the example of FIG. 18A, the sectioning image of FIGS. 16A and 16B are displayed in a superimposed manner. In the example of FIG. 18B, the transmission image of FIG. 17B is further displayed in a superimposed manner on the image of FIG. 18A. In the example of FIG. 19, the normal image of FIG. 17A is displayed in a superimposed manner on the image of FIG. 18B.

If the measuring object S is a biological specimen, it is effective to display the sectioning image and the transmission image (e.g., phase difference-observed image) in a superimposed manner when observing the shape of the cells of the measuring object S. The user is thus able to easily recognize the portion of the measuring object S where the fluorescence is generated only when irradiated with light having a specific wavelength due to the composition of protein. As a result, the nucleus in the cell, the cell membrane, the DNA (Deoxyribo Nucleic Acid), or the like can be easily identified.

(7) Operation of Measurement Unit

For example, in the setting display region 420 of FIG. 15, a filter selecting field 430, a measurement condition setting field 440, a photography analyzing field 450, and a photography class selecting field 490 are displayed. A plurality of tabs are also displayed in the setting display region 420. The plurality of tabs include a focus position adjustment tab 470. The user uses the operation section 250 of the PC 200 of FIG. 4 to operate the GUI (Graphical User Interface) displayed on the display unit 400 thus giving various commands to the CPU 210 and the control board 170 of FIG. 4.

In the filter selecting field 430, a plurality of (4 in the present example) filter selecting buttons 431, 432, 433, 434 are displayed. The 3 filter selecting buttons 431 to 433 correspond to the 3 filter cubes 151 arranged in the filter turret 152, and the filter selecting button 434 corresponds to the through-hole of the filter turret 152 in which the filter cube 151 is not arranged.

One of the filter selecting buttons 431 to 434 is selected by the user. The control board 170 drives the filter turret drive unit 153 of FIG. 3 so that the filter cube 151 or the through-hole of the filter turret 152 corresponding to the selected filter selecting button is positioned on the observation axis OA (optical axis of light receiving section 120) of FIG. 3. Thus, the user can switch the filter cube 151 easily and in a short period of time from the exterior of the external housing 101 by operating the operation section 250 of FIG. 4.

When one of the filter selecting buttons 431 to 433 is selected by the user, the control board 170 controls the pattern applying section 110, the transmitted light supplying section 130, and the light projecting section 320 so that the measuring object S is irradiated with the measurement light and the measuring object S is not irradiated with the transmitted light. Furthermore, when the filter selecting button 434 is selected by the user, the control board 170 controls the pattern applying section 110, the transmitted light supplying section 130, and the light projecting section 320 so that the measuring object S is irradiated with the transmitted light and the measuring object S is not irradiated with the measurement light.

A sectioning observation button 441, a normal observation button 442, and a plurality of setting buttons for setting the measurement condition are displayed in the measurement condition setting field 440. The plurality of setting buttons include, for example, a button for setting the shape of the pattern to be applied to the measurement light and a button for setting the exposure time.

The sectioning observation button 441 is operated by the user with one of the 3 filter selecting buttons 431 to 433 selected. In this case, the control board 170 controls the light modulation element 112 so as to apply the pattern to the measurement light in response to the command from the PC 200. Thus, the measuring object S is irradiated with the pattern measurement light. The normal observation button 442 is operated by the user with one of the 3 filter selecting buttons 431 to 433 selected. In this case, the control board 170 controls the light modulation element 112 so as not to apply a pattern to the measurement light in response to the command from the PC 200.

Thus, the measuring object S is irradiated with the uniform measurement light. Thus, the user can switch between the sectioning observation and the normal observation easily and in a short period of time from the exterior of the external housing 101 by operating the operation section 250 of FIG. 4. The measuring object S can be irradiated with the pattern measurement light and the uniform measurement light through a common light path.

An objective lens selecting field 471, a focus position adjustment field 472, and a stage position adjustment field 473 are displayed in the setting display region 420 with the focus position adjustment tab 470 of the plurality of tabs selected.

In the objective lens selecting field 471, a plurality of (6 in the present example) objective lens selecting buttons 471a, 471b, 471c, 471d, 471e, and 471f are displayed. The 6 objective lens selecting buttons 471a to 471f correspond to the 6 objective lenses 161.

One of the objective lens selecting buttons 471a to 471f is selected by the user. The control board 170 drives the lens turret drive unit 164 so that the objective lens 161 corresponding to the selected one of the objective lens selecting buttons 471a to 471f is positioned on the observation axis OA. Thus, the user can switch the objective lens 161 easily and in a short period of time from the exterior of the external housing 101 by operating the operation section 250 of FIG. 4.

A focus position adjustment bar 472a, an initial distance button 472b, and an auto focus button 472c are displayed in the focus position adjustment field 472. The focus position adjustment bar 472a includes a slider that is movable in the up and down direction. The position of the slider of the focus position adjustment bar 472*a* corresponds to the distance between the measuring object S and the objective lens 161.

The distance between the measuring object S and the objective lens 161 is adjusted by moving the slider of the focus position adjustment bar 472*a*. The control board 170 controls the focal length adjustment drive unit 165 of FIG. 3 so that the distance between the measuring object S and the objective lens 161 becomes a distance adjusted by the slider.

When the initial distance button 472*b* is operated, the control board 170 controls the focal length adjustment drive unit 165 so that the distance between the measuring object S and the objective lens 161 becomes a distance set in advance as the initial condition. When the auto focus button 472*c* is operated, the control board 170 controls the focal length adjustment drive unit 165 so that the focus of the objective lens 161 is on the measuring object S.

Thus, the user can adjust the distance between the measuring object S and the objective lens 161 easily and in a short period of time from the exterior of the external housing 101 by operating the operation section 250 of FIG. 4.

In the stage position adjustment field 473, stage movement buttons 473*a*, 473*b*, 473*c*, 473*d*, and an initial position button 473*e* are displayed. When the stage movement button 473*a*, 473*b* is operated, the control board 170 controls the stage drive unit so that the stage 140 is moved in one direction and the opposite direction in the X direction.

When the stage movement button 473*c*, 473*d* is operated, the control board 170 controls the stage driving device 141 of FIG. 4 so that the stage 140 is moved in one direction and the opposite direction in the Y direction. When the initial position button 473*e* is operated, the control board 170 controls the stage driving device 141 so that the position of measuring object S is moved to the position set in advance as the initial condition.

Thus, the user can move the measuring object S on the stage 140 in the X direction and the Y direction easily and in a short period of time from the exterior of the external housing 101 and adjust the observation range by operating the operation section 250 of FIG. 4.

In the photography analyzing field 450, a single photographing button 451, a multiple-photographing button 452, and an analyzing button 453 are displayed. The single photographing button 451 is operated by the user. In this case, the control board 170 irradiates the measuring object S with the measurement light passing through the currently selected filter cube 151 or the transmitted light passing through the through-hole of the filter turret 152, and transfers the pixel data based on the light receiving signal output from the camera 121 to the PC 200. In the PC 200, the image data based on a plurality of pieces of pixel data is generated, and the generated image data is stored in the storage device 240. The image based on the generated image data is displayed in the image display region 410.

The multiple-photographing button 452 is operated by the user. In this case, the control board 170 irradiates the measuring object S with the measurement light or the transmitted light while controlling the filter turret drive unit 153 and switching the filter cube 151. The control board 170 transfers the pixel data based on the light receiving signal output from the camera 121 to the PC 200 each time the filter cube 151 is switched.

Thus, in the PC 200, the image data corresponding to each of the plurality of filter cubes 151 and the image data obtained by the transmissive observation are generated, and the generated plurality of pieces of image data are stored in the storage device 240. The generated plurality of pieces of image data are superimposed, so that an image in which the plurality of types of fluorescence observation images and transmissive observation images are superimposed is displayed in the image display region 410.

A plurality of observation channels are set during the operation of the multiple-photographing button 452. The user specifies the observation method at each observation channel with an operation button (not shown). For example, if 4 observation channels are set, the user sets the sectioning observation using the GFP to the first observation channel. The user sets the sectioning observation using the Texas Red to the second observation channel. Furthermore, the user sets the normal observation using the DAPI and the phase difference observation by the transmitted light to the third and fourth observation channels, respectively.

In this case, the sectioning observation by the GFP, the sectioning observation by the Texas Red, the normal observation by the DAPI, and the phase difference observation by the transmitted light are automatically switched in such an order by switching the filter cube 151. The generated 2 pieces of sectioning image data, the normal image data, and the transmission image data are superimposed, and the 2 sectioning images, the normal image, and the transmission image are displayed in a superimposed manner in the image display region 410.

The analyzing button 453 is operated by the user. In this case, in the PC 200, the analyzing process of the image data stored in the storage device 240 of FIG. 4 is executed, for example. Here, the control board 170 switches the light shielding mechanism 323 (FIG. 3) of the light projecting section 320 (FIG. 3) from the light guiding state to the light shielding state. Thus, the measurement light is prevented from being emitted from the pattern applying section 110 (FIG. 3) toward the filter unit 150. Therefore, the unnecessary color loss of the fluorescence reagent that occurs when the measuring object S is continuously irradiated with the measurement light can be reduced during the analysis of the image data.

The control board 170 may control the light modulation element 112 so that the measurement light is not emitted from the pattern applying section 110 toward the filter unit 150 instead of switching the light shielding mechanism 323 (FIG. 3) of the light projecting section 320 (FIG. 2) from the light guiding state to the light shielding state during the analysis of the image data. The control board 170 may temporarily shut down the power supply of the measurement light source 321.

In the photography class selecting field 490, a Z stack photographing button 491, an interlock photographing button 492, and an omnifocus photographing button 493 are displayed.

The Z stack photographing button 491 is operated by the user. In this case, the control board 170 transfers the pixel data based on the output of the light receiving section 120 to the PC 200 while changing the distance between the selected objective lens 161 and the measuring object S by controlling the focal length adjustment drive unit 165 of FIG. 3, for example. Thus, in the PC 200, the image data is generated at each position of the focus of the objective lens 161. The generated plurality of pieces of image data are stored in the storage device 240 of FIG. 4, for example.

Thus, when the measuring object S has a three-dimensional structure, the user can obtain a plurality of sectioning images, normal image or transmission image observed with the focus of the objective lens 161 positioned on a plurality of portions of the measuring object S.

The interlock photographing button 492 is operated by the user. In this case, the control board 170 controls the stage driving device 141 of FIG. 4, for example, to move the observation range of the measuring object S by the light receiving section 120 in the X direction or the Y direction. The pixel data based on the output of the light receiving section 120 is transferred to the PC 200 each time the observation range of the measuring object S is moved by a predetermined amount. Thus, in the PC 200, a plurality of pieces of image data corresponding to a plurality of observation ranges different from each other are generated. The generated plurality of pieces of image data are coupled to each other. The coupled image data is stored in the storage device 240 of FIG. 4. Thus, the user can obtain the fluorescence observation image or the transmission image of high magnification over a wider range.

The omnifocus photographing button 493 is operated by the user. In this case, the control board 170 transfers the pixel data based on the output of the light receiving section 120 to the PC 200 while changing the distance between the selected objective lens 161 and the measuring object S, similarly to when the Z stack photographing button 491 is operated. Thus, in the PC 200, the image data is generated at each position of the focus of the objective lens 161.

When the measuring object S has a three-dimensional structure, even if the focus of the objective lens 161 is on a portion of the measuring object S, the focus of the objective lens 161 is not on other portions of the measuring object S. Therefore, the pixel data of some portions of the image data at a certain focus position is obtained with the focus on the portion of the measuring object S, and the pixel data of the other portions is obtained with the focus not on the portion of the measuring object S. Hereinafter, the pixel data obtained with the focus on some portions of the measuring object S is referred to as focused point pixel data.

The focused point pixel data of the plurality of pieces of image data obtained at a plurality of focus positions is synthesized, so that the image data obtained with the focus on the entire measuring object S is generated. Hereinafter, the image data obtained with the focus on the entire measuring object S is referred to as omnifocus image data. An image based on the omnifocus image data is referred to as an omnifocus image. The generated omnifocus image data is stored in the storage device 240 of FIG. 4.

As described above, when the measuring object S has a three-dimensional structure, the user can obtain the omnifocus image in which the focus of the objective lens 161 is on each of a plurality of portions of the measuring object S.

(8) Effect

In the microscopic imaging device 500 according to the present embodiment, the sectioning observation and the normal observation can be switched. The pattern measurement light is generated by the light modulation element 112 from the light emitted by the light projecting section 320 during the sectioning observation, and the uniform measurement light is generated by the light modulation element 112 from the light emitted by the light projecting section 320 during the normal observation.

At the time of the sectioning observation, the measuring object S is irradiated with the pattern measurement light generated by the light modulation element 112 through a light projection optical system including the light projection lens 12, the filter cube 151, and the objective lens 161. At the time of the normal observation, the measuring object S is irradiated with the uniform measurement light generated by the light modulation element 112 through a light projection optical system including the light projection lens 12, the filter cube 151, and the objective lens 161. Thus, the measuring object S is irradiated with the pattern measurement light and the uniform measurement light through a common light path.

The light from the measuring object S is received by the light receiving section 120, and the light receiving signal indicating the light receiving amount is output. At the time of the sectioning observation, the spatial phase of the generated pattern is sequentially moved on the measuring object S by a predetermined amount by the light modulation element 112. The sectioning image data indicating the image of the measuring object S is generated based on a plurality of pieces of image data generated at a plurality of phases of the pattern based on the light receiving signal output from the light receiving section 120. At the time of the normal observation, the normal image data indicating the image of the measuring object S is generated based on the light receiving signal output from the light receiving section 120.

In this case, the pattern measurement light and the uniform measurement light are selectively generated by the light modulation element 112, so that a plurality of light projecting sections for generating the pattern measurement light and the uniform measurement light do not need to be arranged in the microscopic imaging device 500. Furthermore, the pattern measurement light and the uniform measurement light pass through a common light path, so that the measuring object S can be irradiated with the pattern measurement light and the uniform measurement light using the common light projection lens 12, filter cube 151, and objective lens 161.

Furthermore, the irradiation center and the irradiation range of the pattern measurement light, and the irradiation center and the irradiation range of the uniform measurement light can be coincided without aligning the optical axes of the pattern measurement light and the uniform measurement light. As a result, the imaging method can be easily switched while achieving miniaturization and lighter weight of the microscopic imaging device 500.

(9) Variant (a) First Variant

Figure 20:
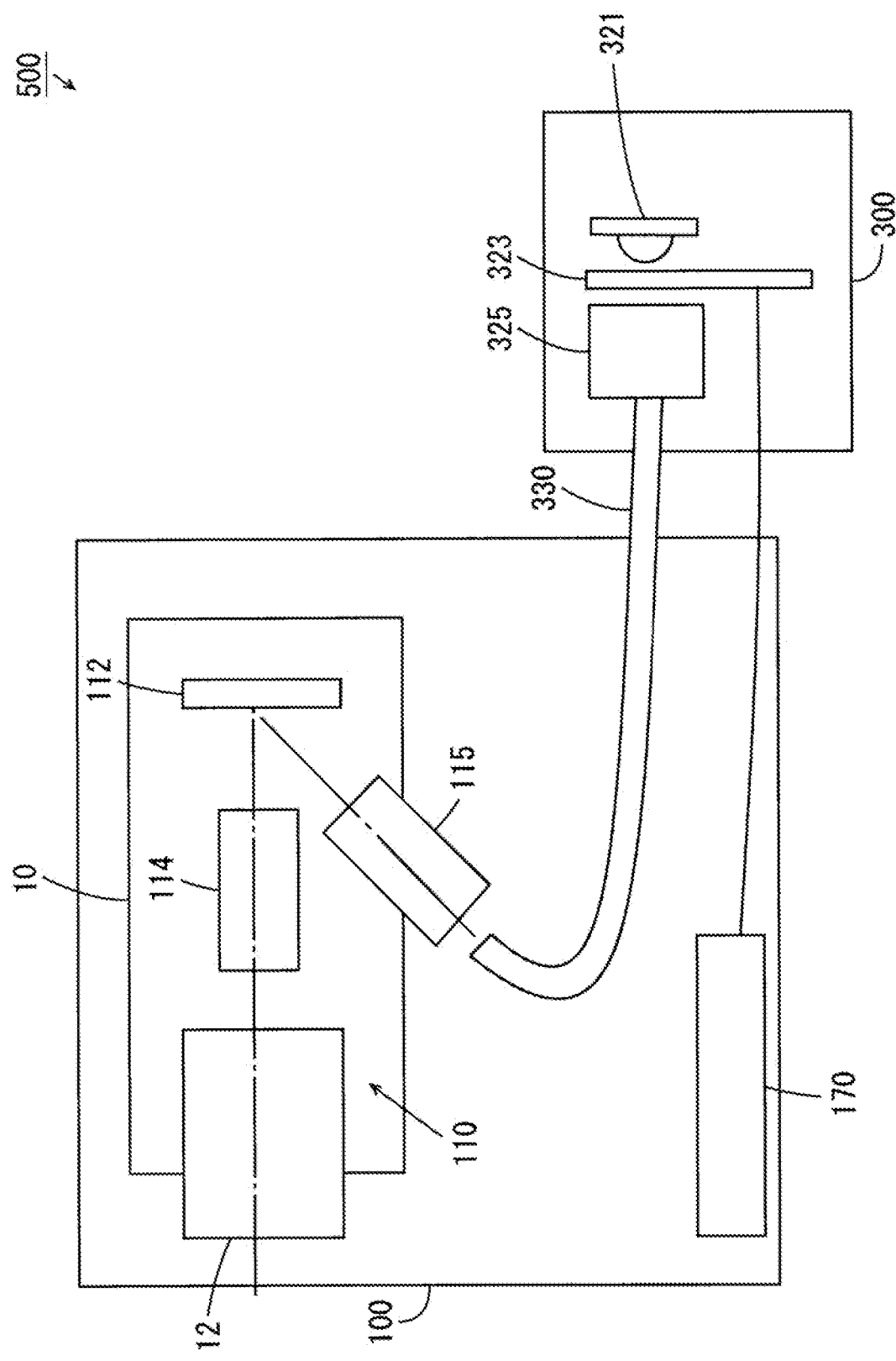
FIG. 20 is a block diagram showing a configuration of a microscopic imaging device according to a first variant.

In addition to the light modulation element 112, other optical members may be arranged in the internal housing 10. In addition to the 2 mirrors 113 or in place of the 2 mirrors 113, other optical members may be arranged in the light guiding component supporting case 11. FIG. 20 is a block diagram showing a configuration of the microscopic imaging device 500 according to a first variant.

In FIG. 20, the illustration of the PC 200 and the display unit 400 is omitted. In the measurement unit 100, the illustration of the light receiving section 120, the transmitted light supplying section 130, the stage 140, the filter unit 150, and the lens unit 160 is omitted. Furthermore, in the measurement light supplying unit 300, the illustration of the power supply device 310 and the light extinction mechanism 322 of the light projecting section 320 is omitted. This is the same in FIGS. 21 to 26, to be described later.

As shown in FIG. 20, in the first variant, an optical member 114 is arranged in addition to the light modulation element 112 of FIG. 3 in the internal housing 10. The optical member 114 includes, for example, at least one of the collector lens, the relay lens, the diaphragm, the mirror, the light modulation element for adjusting the intensity of the measurement light, and the light extinction mechanism. An optical member 115 is arranged in place of the mirror 113 of FIG. 3 in the light guiding component supporting case 11. The optical member 115 includes, for example, at least one of the collector lens, the relay lens, the diaphragm, the light modulation element for adjusting the intensity of the measurement light, and the light extinction mechanism.

An optical member 325 is further arranged in the light projecting section 320 (FIG. 3) of the measurement light supplying unit 300. The optical member 325 includes, for example, at least one of the collector lens, the mirror, the light modulation element for adjusting the intensity of the measurement light, and the light extinction mechanism.

In the present example, the measurement light emitted from the measurement light source 321 passes through the light shielding mechanism 323 and the optical member 325, and enters one end of the light guiding member 330. The measurement light emitted from the other end of the light guiding member 330 passes through the optical member 115 and enters the light modulation element 112. The measurement light entering the light modulation element 112 is converted to have an intensity set in advance, and reflected. The measurement light reflected by the light modulation element 112 passes through the optical member 114 and the light projection lens 12, and enters the filter unit 150 of FIG. 3.

In the present example, the measuring object S is irradiated with the pattern measurement light and the uniform measurement light generated by the light modulation element 112 through the common light path, and hence the effects similar to the effects of the embodiment described above can be obtained.

Figure 21:
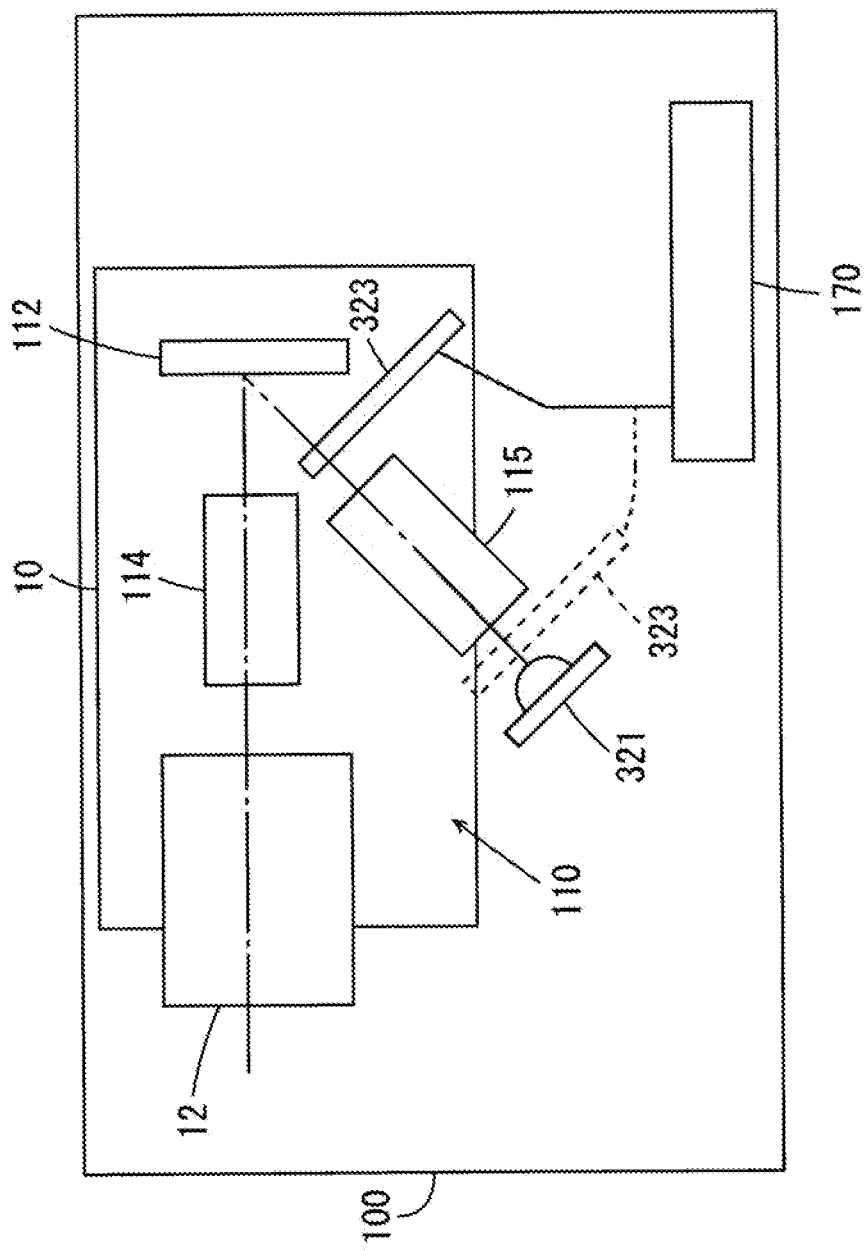
FIG. 21 is a block diagram showing a configuration of a microscopic imaging device according to a second variant.

(b) In the embodiment described above, the light projecting section 320 is arranged separated from the measurement unit 100. This is not the sole case, the light projecting section 320 may be arranged in the measurement unit 100. FIG. 21 is a block diagram showing a configuration of the microscopic imaging device 500 according to a second variant. The microscopic imaging device 500 according to the second variant will be described regarding the difference with the microscopic imaging device 500 according to the first variant.

As shown in FIG. 21, in the second variant, the measurement light source 321 and the light shielding mechanism 323 of FIG. 3 are arranged in the measurement unit 100. The light shielding mechanism 323 is arranged between the optical member 115 and the light modulation element 112 in the internal housing 10. The measurement light emitted from the measurement light source 321 passes through the optical member 115 and the light shielding mechanism 323 and enters the light modulation element 112. The light entering the light modulation element 112 is converted to have an intensity set in advance, and reflected. The measurement light reflected by the light modulation element 112 passes through the optical member 114 and the light projection lens 12, and enters the filter unit 150 of FIG. 3.

Thus, the light shielding mechanism 323 may be arranged at any position as long as it is on a light path from the measurement light source 321 to the light modulation element 112. Therefore, the light shielding mechanism 323 may be arranged not between the optical member 115 and the light modulation element 112, but between the measurement light source 321 and the optical member 115 as shown with a dotted line in FIG. 21. When shielding the measurement light over a relatively long period of time, the measurement light is shielded by the light shielding mechanism 323, and thus the damages of the light modulation element 112 can be minimized.

Figure 22:
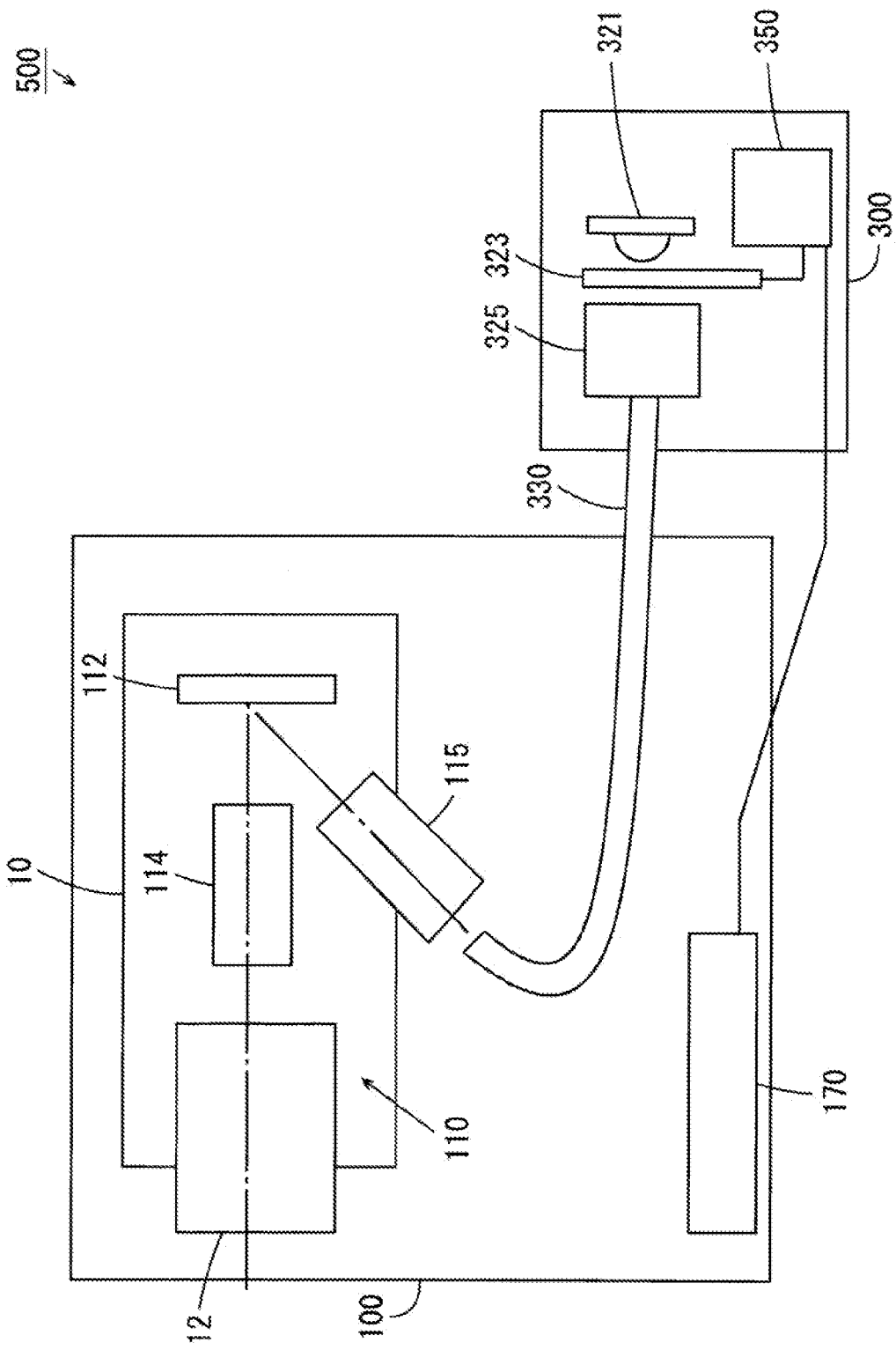
FIG. 22 is a block diagram showing a configuration of a microscopic imaging device according to a third variant.

(c) In the embodiment described above, the control board 170 arranged on the measurement unit 100 switches the light guiding state and the light shielding state of the light shielding mechanism 323, but this is not the sole case. FIG. 22 is a block diagram showing a configuration of the microscopic imaging device 500 according to a third variant. The microscopic imaging device 500 according to the third variant will be described regarding the difference with the microscopic imaging device 500 according to the first variant.

As shown in FIG. 22, in the third variant, a control board 350 is arranged on the measurement light supplying unit 300. The control board 170 and the control board 350 are connected by a signal line of the wiring WR2 of FIG. 1. The control board 350 switches the light guiding state and the light shielding state of the light shielding mechanism 323 based on the control by the CPU 210 of FIG. 4 through the control board 170. The control board 350 may switch the light guiding state and the light shielding state of the light shielding mechanism 323 based on the control by the CPU 210 without interposing the control board 170.

The CPU (not shown) arranged on the control board 170 may switch the light guiding state and the light shielding state of the light shielding mechanism 323 based on the state of the measurement light supplying unit 300. For example, the CPU of the control board 170 may switch the light guiding state and the light shielding state of the light shielding mechanism 323 based on the detection result of the open/close state of the upper surface lid 102 or the front surface lid 103. The CPU of the control board 170 may switch the light guiding state and the light shielding state of the light shielding mechanism 323 based on the detection result on whether or not the light guiding member 330 is connected between the optical connectors 111, 324. The CPU of the control board 170 may switch the light guiding state and the light shielding state of the light shielding mechanism 323 at the time of the replacement of the measurement light source 321.

Figure 23:
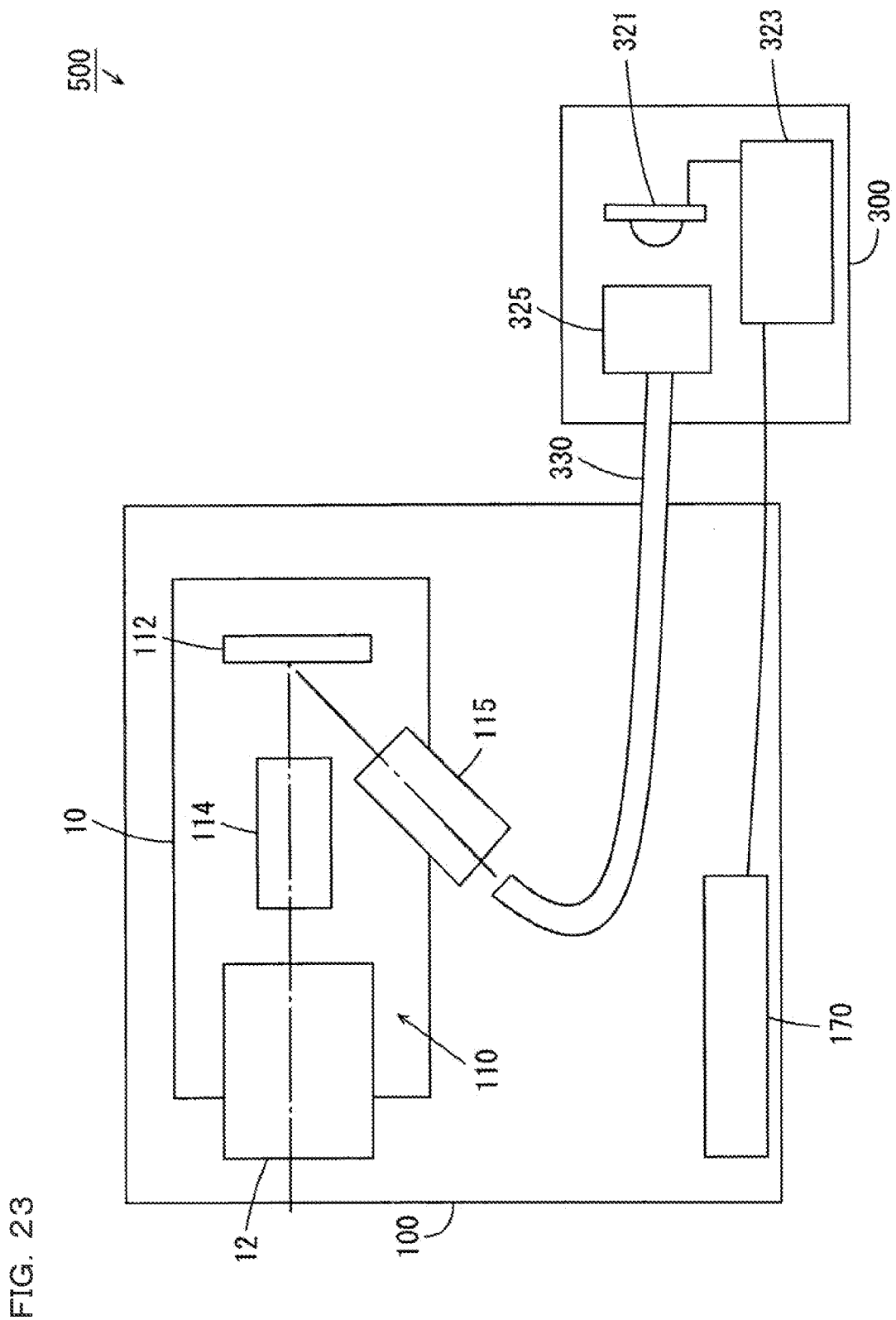
FIG. 23 is a block diagram showing a configuration of a microscopic imaging device according to a fourth variant.

(d) In the embodiment described above, the light shielding mechanism 323 is a mechanical shutter, but this is not the sole case. The light shielding mechanism 323 may be other light shielding mechanisms. FIG. 23 is a block diagram showing a configuration of the microscopic imaging device 500 according to a fourth variant. The microscopic imaging device 500 according to the fourth variant will be described regarding the difference with the microscopic imaging device 500 according to the first variant.

As shown in FIG. 23, in the fourth variant, the light shielding mechanism 323 is a switching mechanism, for example, and is electrically connected to the measurement light source 321. The control board 170 switches the light guiding state and the light shielding state by switching the light shielding mechanism 323 ON and OFF. If the power supply device 310 has a function of the light shielding mechanism 323 in the present example, the light shielding mechanism 323 may not be arranged in the measurement light supplying unit 300.

If the light shielding mechanism 323 is in the light guiding state, the power is supplied from the power supply device 310 of FIG. 2 to the measurement light source 321. In this case, the measurement light source 321 emits the measurement light. The measuring object S is thereby irradiated with the measurement light. If the light shielding mechanism 323 is in the light shielding state, the supply of power from the power supply device 310 to the measurement light source 321 is stopped. In this case, the measurement light is not emitted from the measurement light source 321. The irradiation with the measurement light on the measuring object S is thereby shielded.

Figure 24:
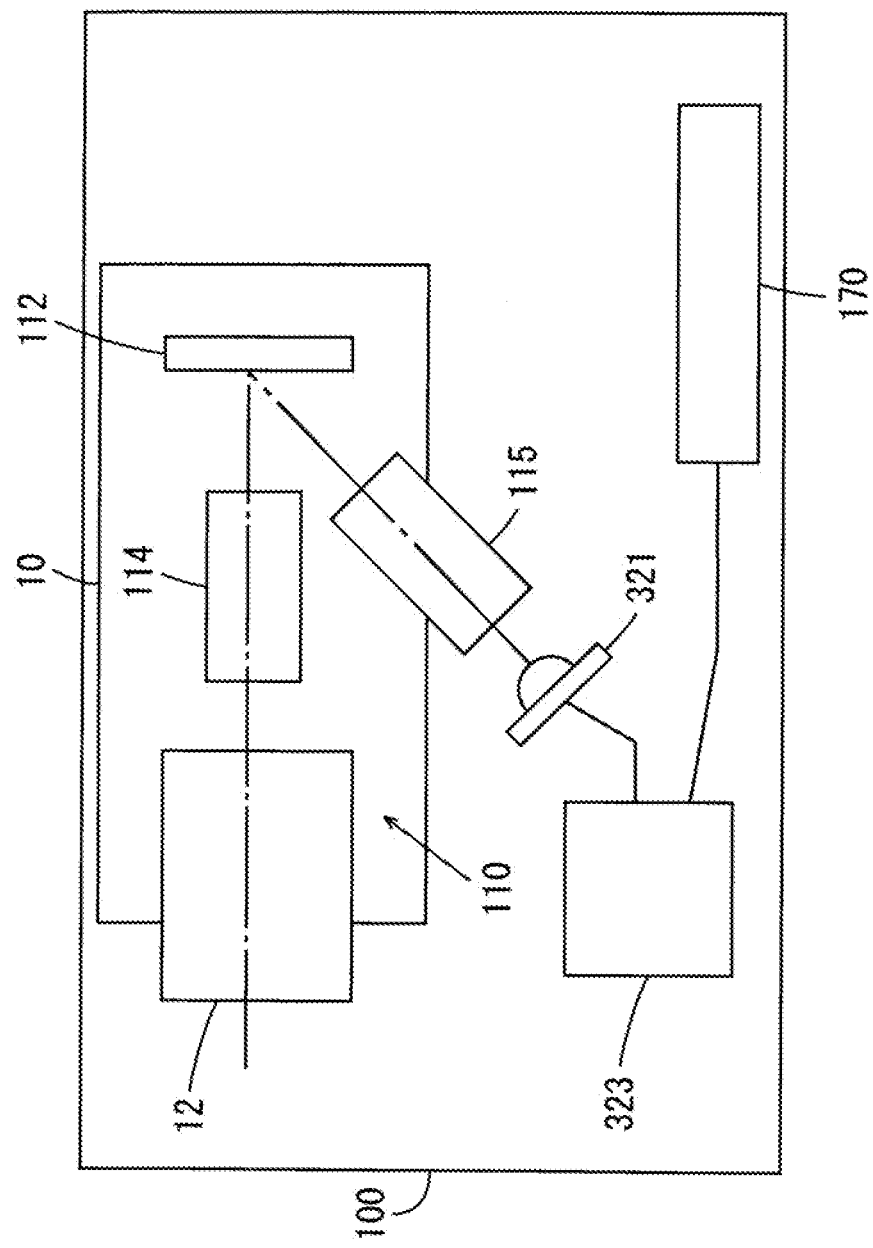
FIG. 24 is a block diagram showing a configuration of a microscopic imaging device according to a fifth variant.

(e) FIG. 24 is a block diagram showing a configuration of the microscopic imaging device 500 according to a fifth variant. The microscopic imaging device 500 according to the fifth variant will be described regarding the difference with the microscopic imaging device 500 according to the second variant.

As shown in FIG. 24, in the fifth variant, the light shielding mechanism 323 is a switching mechanism, for example, similarly to the fourth variant. The light shielding mechanism 323 is electrically connected to the measurement light source 321. The control board 170 switches the light guiding state and the light shielding state by switching the light shielding mechanism 323 ON and OFF.

If the light shielding mechanism 323 is in the light guiding state, the power is supplied from the power supply device 310 of FIG. 2 to the measurement light source 321. In this case, the measurement light source 321 emits the measurement light. The measuring object S is thereby irradiated with the measurement light. If the light shielding mechanism 323 is in the light shielding state, the supply of power from the power supply device 310 to the measurement light source 321 is stopped. In this case, the measurement light is not emitted from the measurement light source 321. The irradiation with the measurement light on the measuring object S is thereby shielded.

Figure 25:
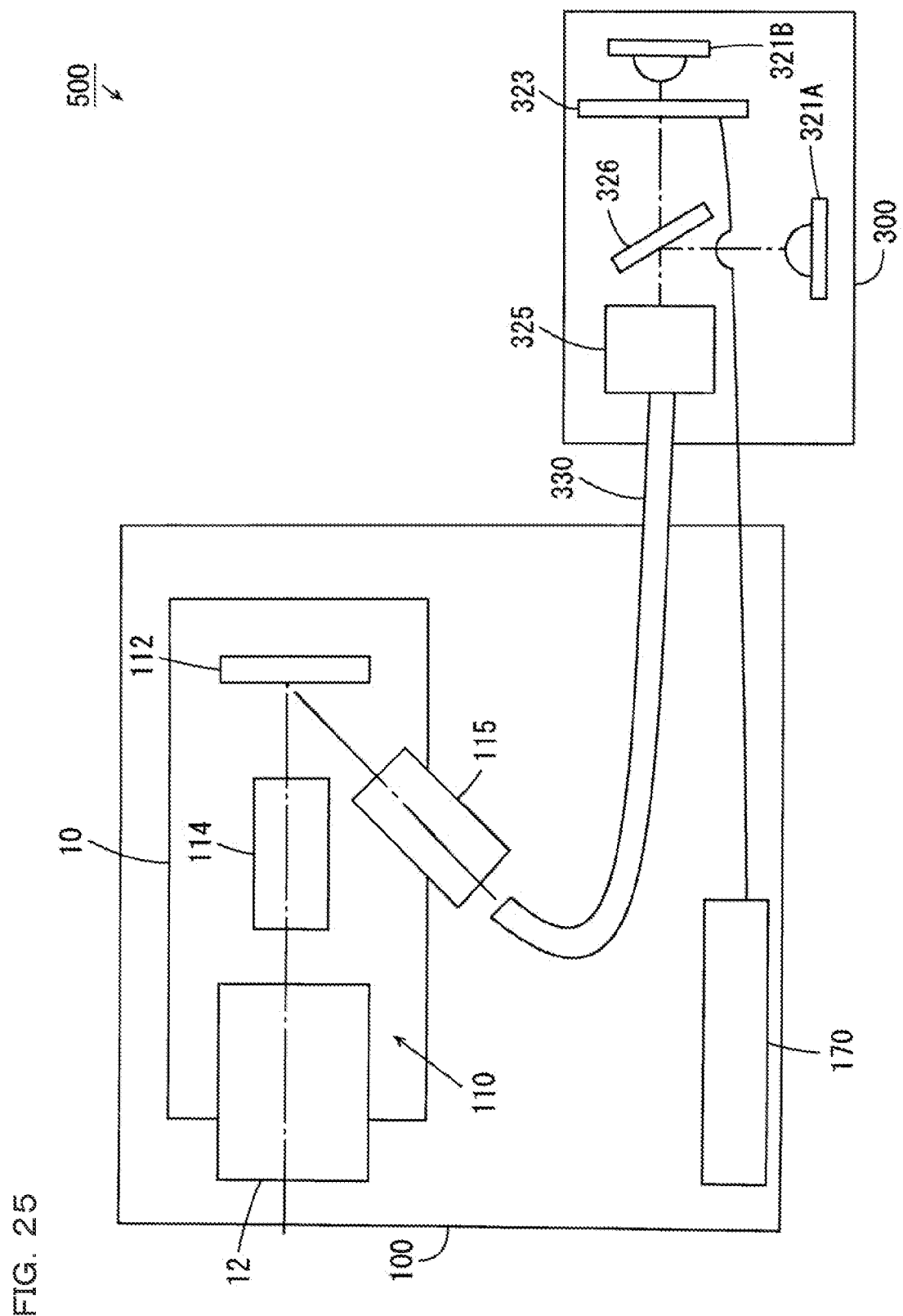
FIG. 25 is a block diagram showing a configuration of a microscopic imaging device according to a sixth variant.

(f) In the embodiment described above, the light projecting section 320 includes one measurement light source 321, but this is not the sole case. The light projecting section 320 may include a plurality of measurement light sources 321. FIG. 25 is a block diagram showing a configuration of a microscopic imaging device 500 according to a sixth variant. The microscopic imaging device 500 according to the sixth variant will be described regarding the difference with the microscopic imaging device 500 according to the first variant.

As shown in FIG. 25, in the sixth variant, the light projecting section 320 includes 2 measurement light sources 321, or measurement light sources 321A, 321B. The measurement light source 321A is, for example, a halogen lamp, and emits white light. The measurement light source 321B is, for example, an ultraviolet LED or an infrared LED, and emits ultraviolet light or infrared light.

A half mirror 326 is arranged to reflect the measurement light emitted from the measurement light source 321A to the light guiding member 330, and transmit the measurement light emitted from the measurement light source 321B to the light guiding member 330. The light shielding mechanism 323 is arranged between the measurement light source 321B and the half mirror 326.

In the present example, the guiding and the shielding of the measurement light emitted from the measurement light source 321A is switched by the light modulation element 112. The guiding and the shielding of the measurement light emitted from the measurement light source 321B are switched by the light shielding mechanism 323. According to such a configuration, the degradation of the light modulation element 112 by the measurement light of the ultraviolet region or the infrared region from the measurement light source 321B is further suppressed. Longer lifespan of the light modulation element 112 is thereby realized.

Figure 26:
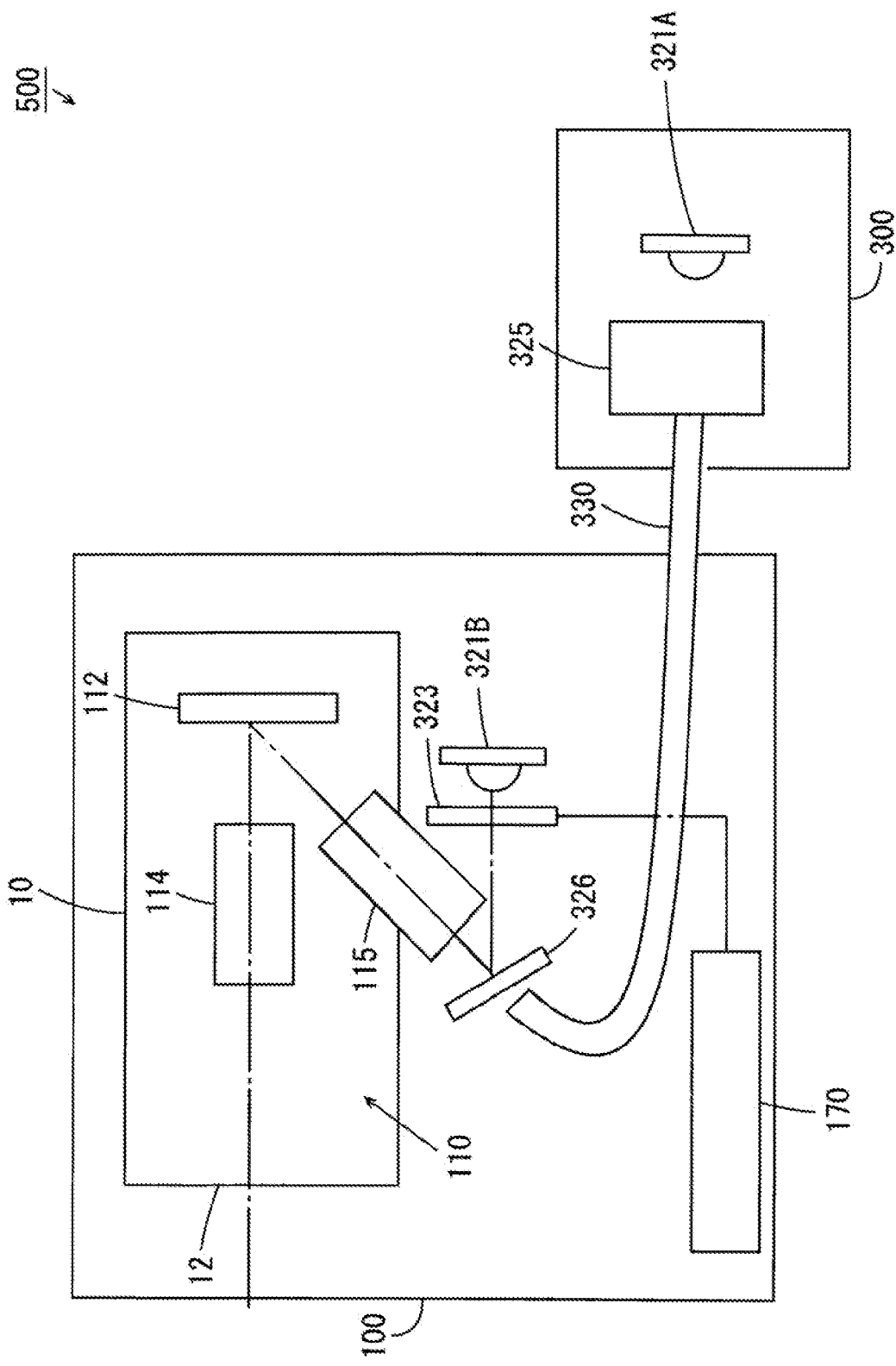
FIG. 26 is a block diagram showing a configuration of a microscopic imaging device according to a seventh variant.

(g) FIG. 26 is a block diagram showing a configuration of the microscopic imaging device 500 according to a seventh variant. The microscopic imaging device 500 according to the seventh variant will be described regarding the difference with the microscopic imaging device 500 according to the sixth variant.

As shown in FIG. 26, in the seventh variant, the measurement light source 321B, the light shielding mechanism 323, and the half mirror 326 are arranged in the measurement unit 100. The half mirror 326 is arranged to reflect the measurement light, which is emitted from the measurement light source 321B and passes through the light shielding mechanism 323, to the optical member 115, and transmit the measurement light emitted from the measurement light source 321A to the optical member 115 through the light guiding member 330.

According to such a configuration, a plastic optical fiber having low durability with respect to the light of the ultraviolet region and the infrared region can be used for the light guiding member 330. Thus, the manufacturing cost of the microscopic imaging device 500 can be reduced.

(h) In the embodiment described above, one objective lens 161 to use for the observation is selected from a plurality of objective lenses 161 in the lens unit 160. The selected objective lens 161 is positioned on the observation axis OA by rotating the lens turret 162. This is not the sole case, and a zoom lens and a driving device thereof may be arranged in the lens unit 160 in place of the plurality of objective lenses 161, the lens turret 162, and the lens turret drive unit 164. In this case, for example, the user operates the operation section 250 of FIG. 4 to specify the magnification. Thus, the control board 170 adjusts the magnification of the zoom lens to realize the specified magnification.

(i) In the embodiment described above, the focal length adjustment drive unit 165 moves the objective lens 161 in the Z direction to adjust the distance between the measuring object S and the objective lens 161. This is not the sole case, and the focal length adjustment drive unit 165 may move the stage 140 in the Z direction to adjust the distance between the measuring object S and the objective lens 161.

(j) In the embodiment described above, the plurality of objective lenses 161 are switched, so that the measuring object S can be observed at a plurality of magnifications different from each other. This is not the sole case, and only one objective lens 161 may be arranged in the measurement unit 100. In this case, the objective lens 161 may be configured so as to be removably attached to the measurement unit 100. Thus, the miniaturization of the measurement unit 100 and the simplification of the configuration can be achieved.

Similarly, in the embodiment described above, the plurality of filter cubes 151 are switched, so that the measuring object S can be fluorescence observed with the measurement light having wavelength regions different from each other. This is not the sole case, and only one filter cube 151 may be arranged in the measurement unit 100. In this case, the filter cube 151 may be configured so as to be removably attached to the measurement unit 100. Thus, the miniaturization of the measurement unit 100 and the simplification of the configuration can be realized.

(k) In the embodiment described above, the light projection lens 12 is arranged to block the emission opening 10a formed in the internal housing 10. This is not the sole case, and the light projection lens 12 may be arranged on the inner side of the internal housing 10 or may be arranged on the outer side of the internal housing 10. In these cases, the emission opening 10a of the internal housing 10 is not blocked by the light projection lens 12. A translucent member that transmits the measurement light may be arranged at the emission opening 10a. Dust thus is prevented from advancing into the internal housing 10 from the emission opening 10a.

(10) Correspondence Relationship Between Each Configuring Element of the Claims and Each Unit of the Embodiment An example of correspondence of each configuring element of the claims and each unit of the embodiment will be hereinafter described, but the present invention is not limited to the following example.

In the embodiment described above, the measuring object S serves as an example of a measuring object; the operation section 250 serves as an example of an instructing section; the light projecting section 320 serves as an example of a first light projecting section; the transmissive light source 131 serves as an example of a second light projecting section; and the light modulation element 112 serves as an example of a light modulation element. The light projection lens 12, the filter cube 151, and the objective lens 161 serve as an example of a first light projection optical system; the transmissive optical system 133 serves as an example of a second light projecting section; the light receiving section 120 serves as an example of a light receiving section; and the image data generating portion 211 serves as an example of an image data generating portion. The pattern generating portion 212 serves as an example of a pattern generating portion; the controller 213 serves as an example of a controller and a processing device; the light shielding mechanism 323 serves as an example of a light shielding mechanism; and the microscopic imaging device 500 serves as an example of a microscopic imaging device.

Various other elements having the configuration or the function described in the claims can be used for each configuring element of the claims.

The present invention can be effectively used in various microscopic imaging devices, microscopic imaging methods, and microscopic imaging programs.

What is claimed is:

1. A microscopic imaging device comprising:
   a first light projecting section that emits light;
   a light modulation element that is configured to selectively generate first measurement light with a pattern and second measurement light without a pattern from the light emitted by the first light projecting section;
   a first light projection optical system that irradiates a measuring object with the first and second measurement light generated by the light modulation element through a common light path;
   a second light projecting section that emits third measurement light;
   a second light projection optical system that irradiates the measuring object with the third measurement light emitted by the second light projecting section;
   a light receiving section that receives light from the measuring object and outputs a light receiving signal indicating a light receiving amount;
   an image data generating portion that generates image data based on the light receiving signal output from the light receiving section;
   a pattern generating portion that generates a pattern to be irradiated on the measuring object while sequentially moving a spatial phase by a predetermined amount;
   an instructing section that switches a first observation mode of observing the measuring object using the first measurement light and a second observation mode of observing the measuring object using the second measurement light; and
   a controller that controls the light modulation element based on the pattern generated by the pattern generating portion and controls the image data generating portion to generate sectioning image data indicating an image of the measuring object based on a plurality of pieces of image data generated at a plurality of phases of the pattern during the first observation mode, and controls the image data generating portion to generate normal image data indicating an image of the measuring object during the second observation mode, wherein
   the instructing section is configured to further switch between the first or second observation mode and a third observation mode of observing the measuring object using the third measurement light, and
   the controller controls the image data generating portion to generate transmission image data indicating an image of the measuring object during the third observation mode.

2. The microscopic imaging device according to claim 1, wherein
   the light modulation element includes a light guiding state of guiding the first or second measurement light to the first light projection optical system, and a light shielding state of not guiding the first and second measurement light to the first light projection optical system, and
   the controller controls the light guiding state and the light shielding state of the light modulation element.

3. The microscopic imaging device according to claim 2, wherein
   the instructing section is configured to instruct an observation region, and
   the controller controls the light guiding state and the light shielding state for each of a plurality of portions of the light modulation element so that an observation region instructed by the instructing section is irradiated with the first or second measurement light, and a region other than the observation region is not irradiated with the first and second measurement light.

4. The microscopic imaging device according to claim 2, wherein the controller controls a ratio of a period of the light guiding state to a period of the light shielding state of the light modulation element in a light receiving period of the light receiving section.

5. The microscopic imaging device according to claim 4, wherein the controller controls a ratio of the period of the light guiding state to the period of the light shielding state for each of the plurality of portions of the light modulation element.

6. The microscopic imaging device according to claim 2, further comprising:
   a light shielding mechanism including a light guiding state of guiding light from the first light projecting section to the light modulation element, and a light shielding state of not guiding the light from the first light projecting section to the light modulation element, wherein
   the controller controls the light guiding state and the light shielding state of the light shielding mechanism.

7. The microscopic imaging device according to claim 6, wherein the controller controls the light shielding mechanism to the light shielding state after elapse of a constant time when the light modulation element is in the light shielding state.

8. The microscopic imaging device according to claim 6, wherein the light shielding mechanism includes a mechanical shutter, and is arranged on a light path from the first light projecting section to the light modulation element.

9. The microscopic imaging device according to claim 6, wherein the light shielding mechanism includes a switching mechanism, and stops supply of power to the first light projecting section.

10. A microscopic imaging method comprising the steps of:
- accepting an instruction to switch a first observation mode of observing a measuring object using first measurement light with a pattern and a second observation mode of observing the measuring object using second measurement light without a pattern and a third observation mode of observing the measuring object using a third measurement light;
- emitting light by a first light projecting section;
- emitting light by a second light projection section;
- generating the first measurement light by a light modulation element from the light emitted by the first light projecting section during the first observation mode, and generating the second measurement light by the light modulation element from the light emitted by the first light projecting section during the second observation mode;
- generating the third measurement light by a light modulation element from the light emitted by the second light projecting section during the third observation mode;
- irradiating the measuring object by a first light projection optical system with the first measurement light generated by the light modulation element during the first observation mode, and irradiating the measuring object by the first light projection optical system with the second measurement light generated by the light modulation element during the second observation mode;
- sequentially moving a spatial phase of the generated pattern on the measuring object by a predetermined amount by the light modulation element during the first observation mode;
- receiving light from the measuring object with a light receiving section, and outputting a light receiving signal indicating a light receiving amount; and
- generating sectioning image data indicating an image of the measuring object based on a plurality of pieces of image data generated at a plurality of phases of the pattern based on the light receiving signal output from the light receiving section during the first observation mode, and generating normal image data indicating an image of the measuring object based on the light receiving signal output from the light receiving section during the second observation mode, and generating transmission data indicating an image of the measuring object during the third observation mode, wherein
- the measuring object is irradiated by the first light projection optical system with the first and second measurement light generated by the light modulation element through a common light path.

11. A non-transitory storage medium comprising instructions which when executed causes a computer to perform the steps of:
- accepting an instruction to switch a first observation mode of observing a measuring object using first measurement light with a pattern and a second observation mode of observing the measuring object using second measurement light without a pattern and a third observation mode of observing the measuring object using a third measurement light;
- emitting light by a first light projecting section;
- emitting light by a second light projection section;
- generating the first measurement light by a light modulation element from the light emitted by the first light projecting section during the first observation mode, and generating the second measurement light by the light modulation element from the light emitted by the first light projecting section during the second observation mode;
- generating the third measurement light by a light modulation element from the light emitted by the second light projecting section during the third observation mode;
- irradiating the measuring object by a first light projection optical system with the first measurement light generated by the light modulation element during the first observation mode, and irradiating the measuring object by the first light projection optical system with the second measurement light generated by the light modulation element during the second observation mode;
- sequentially moving a spatial phase of the generated pattern on the measuring object by a predetermined amount by the light modulation element during the first observation mode;
- receiving light from the measuring object with a light receiving section, and outputting a light receiving signal indicating a light receiving amount; and
- generating sectioning image data indicating an image of the measuring object based on a plurality of pieces of image data generated at a plurality of phases of the pattern based on the light receiving signal output from the light receiving section during the first observation mode, and generating normal image data indicating an image of the measuring object based on the light receiving signal output from the light receiving section during the second observation mode, and generating transmission data indicating an image of the measuring object during the third observation mode, wherein
- the measuring object is irradiated by the first light projection optical system with the first and second measurement light generated by the light modulation element through a common light path.

* * * * *